US009846968B2

(12) United States Patent
Tomlin et al.

(10) Patent No.: US 9,846,968 B2
(45) Date of Patent: Dec. 19, 2017

(54) HOLOGRAPHIC BIRD'S EYE VIEW CAMERA

(71) Applicants: Arthur Charles Tomlin, Kirkland, WA (US); Evan Michael Keibler, Bellevue, WA (US); Nicholas Gervase Fajt, Seattle, WA (US); Brian J. Mount, Seattle, WA (US); Gregory Lowell Alt, Seattle, WA (US); Jorge Tosar, Snoqualmie, WA (US); Jonathan Michael Lyons, Kirkland, WA (US); Anthony J. Ambrus, Seattle, WA (US); Cameron Quinn Egbert, Redmond, WA (US); Will Guyman, Medina, WA (US); Jeff W. McGlynn, Seattle, WA (US); Jeremy Hance, Bothell, WA (US); Roger Sebastian-Kevin Sylvan, Seattle, WA (US); Alexander Georg Pfaffe, Sammamish, WA (US); Dan Kroymann, Kirkland, WA (US); Erik Andrew Saltwell, Seattle, WA (US); Chris Word, Seattle, WA (US)

(72) Inventors: Arthur Charles Tomlin, Kirkland, WA (US); Evan Michael Keibler, Bellevue, WA (US); Nicholas Gervase Fajt, Seattle, WA (US); Brian J. Mount, Seattle, WA (US); Gregory Lowell Alt, Seattle, WA (US); Jorge Tosar, Snoqualmie, WA (US); Jonathan Michael Lyons, Kirkland, WA (US); Anthony J. Ambrus, Seattle, WA (US); Cameron Quinn Egbert, Redmond, WA (US); Will Guyman, Medina, WA (US); Jeff W. McGlynn, Seattle, WA (US); Jeremy Hance, Bothell, WA (US); Roger Sebastian-Kevin Sylvan, Seattle, WA (US); Alexander Georg Pfaffe, Sammamish, WA (US); Dan Kroymann, Kirkland, WA (US); Erik Andrew Saltwell, Seattle, WA (US); Chris Word, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 113 days.

(21) Appl. No.: 14/728,650

(22) Filed: Jun. 2, 2015

(65) Prior Publication Data

US 2016/0210783 A1 Jul. 21, 2016

Related U.S. Application Data

(60) Provisional application No. 62/105,701, filed on Jan. 20, 2015.

(51) Int. Cl.
*G09G 5/00* (2006.01)
*G06T 19/00* (2011.01)
(Continued)

(52) U.S. Cl.
CPC ........ *G06T 19/006* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 7,804,507 B2 9/2010 Yang et al.
8,487,838 B2 7/2013 Lewis et al.
(Continued)

OTHER PUBLICATIONS

Cosco, et al., "Visuo-Haptic Mixed Reality with Unobstructed Tool-Hand Integration", In IEEE Transactions on Visualization and Computer Graphics, vol. 19, No. 1, Jan. 2013, pp. 159-172.
(Continued)

*Primary Examiner* — Ryan R Yang

(74) *Attorney, Agent, or Firm* — Arent Fox LLP

(57) ABSTRACT

A system and method are disclosed for capturing views of a mixed reality environment from various perspectives which can be displayed on a monitor. The system includes one or more physical cameras at user-defined positions within the mixed reality environment. The system renders virtual objects in the mixed reality environment from the perspective of the one or more cameras. Real and virtual objects from the mixed reality environment may then be displayed from the perspective of the one or more cameras on one or more external, 2D monitor for viewing by others.

20 Claims, 13 Drawing Sheets

(51) Int. Cl.
  *H04N 5/225* (2006.01)
  *G06F 3/01* (2006.01)
  *G02B 27/00* (2006.01)
  *G02B 27/01* (2006.01)

(52) U.S. Cl.
  CPC ............ *G06F 3/011* (2013.01); *H04N 5/2252* (2013.01); *G02B 2027/0138* (2013.01); *G02B 2027/0178* (2013.01)

(56) References Cited

U.S. PATENT DOCUMENTS

| | | | |
|---|---|---|---|
| 8,633,946 | B2 | 1/2014 | Cohen |
| 2011/0254860 | A1 | 10/2011 | Zontrop et al. |
| 2012/0105473 | A1* | 5/2012 | Bar-Zeev ............... G06F 3/012 345/633 |
| 2012/0113223 | A1 | 5/2012 | Hilliges et al. |
| 2012/0188256 | A1 | 7/2012 | Lee et al. |
| 2012/0306850 | A1 | 12/2012 | Balan et al. |
| 2013/0128364 | A1 | 5/2013 | Wheeler et al. |
| 2013/0147838 | A1 | 6/2013 | Small et al. |
| 2013/0169682 | A1 | 7/2013 | Novak et al. |
| 2013/0326364 | A1* | 12/2013 | Latta ...................... G06F 3/012 715/751 |
| 2013/0335405 | A1 | 12/2013 | Scavezze et al. |
| 2014/0002491 | A1 | 1/2014 | Lamb et al. |
| 2014/0168261 | A1 | 6/2014 | Margolis et al. |
| 2014/0361956 | A1* | 12/2014 | Mikhailov ......... H04N 13/0271 345/8 |
| 2014/0368534 | A1 | 12/2014 | Salter et al. |
| 2014/0368535 | A1 | 12/2014 | Salter et al. |
| 2014/0372957 | A1 | 12/2014 | Keane et al. |
| 2016/0189429 | A1* | 6/2016 | Mallinson .............. G02B 26/10 345/633 |

OTHER PUBLICATIONS

Szalavári, et al., ""Studierstube": An Environment for Collaboration in Augmented Reality", In Journal of Virtual Reality, vol. 3, Issue 1, Mar. 1998, 15 pages.

Benko, et al., "Collaborative Mixed Reality Visualization of an Archaeological Excavation", In Proceedings of 3rd IEEE and ACM International Symposium on Mixed and Augmented Reality, Nov. 2, 2004, 9 pages.

Ohshima, et al., "AR2Hockey: A Case Study of Collaborative Augmented Reality", In Proceedings of IEEE Virtual Reality Annual International Symposium, Mar. 14, 1998, 8 pages.

Ando, et al., "Head Mounted Display for Mixed Reality using Holographic Optical Elements", In Proceedings of Memoirs of the Faculty of Engineering, vol. 40, Sep. 30, 1999, 6 pages.

"Canon Launches New MR (Mixed Reality) System, Contributing to Shorter Development Times During Product Design", Published on: Jun. 18, 2012, Available at: http://www.canon.com/news/2012/jun18e.html.

Billinghurst, et al., "Collaborative Mixed Reality", In Proceedings of the International Symposium on Mixed Reality, Mar. 19, 1999, 18 pages.

Billinghurst, et al., "A Wearable Spatial Conferencing Space", In Proceedings of Second International Symposium on Wearable Computers, Oct. 19, 1998, 8 pages.

Kato, et al., "Virtual Object Manipulation on a Table-Top AR Environment", In Proceedings of IEEE and ACM International Symposium on Augmented Reality, Oct. 5, 2000, 9 pages.

Raskar, et al., "Table-Top Spatially-Augmented Reality: Bringing Physical Models to Life with Projected Imagery", In Proceedings of the 2nd IEEE and ACM International Workshop on Augmented Reality, Oct. 20, 1999, 8 pages.

Piekarski, et al., "Augmented Reality Working Planes:A Foundation for Action and Construction at a Distance", In Proceedings of the Third IEEE and ACM International Symposium on Mixed and Augmented Reality, Nov. 2, 2004, 10 pages.

"International Search Report and Written Opinion Issued in PCT Application No. PCT/US2016/013127", dated Apr. 1, 2016, 14 Pages.

"Second Written Opinion Issued in PCT Application No. PCT/US2016/013127", dated Dec. 12, 2016, 10 Pages.

* cited by examiner (Step 606)

(Step 608)

*(Step 614)*

HOLOGRAPHIC BIRD'S EYE VIEW CAMERA

The present application claims priority to provisional patent application No. 62/105,701, entitled, "Holographic Bird's Eye View Camera," filed Jan. 20, 2015.

BACKGROUND

Mixed reality is a technology that allows virtual imagery to be mixed with a real-world physical environment. A see-through, head mounted, mixed reality display device may be worn by a user to view the mixed imagery of real objects and virtual objects displayed in the user's field of view. However, others not having a head mounted display device cannot see the mixed reality environment. They can see the real objects, but not the virtual objects.

SUMMARY

Embodiments of the present technology in general relate to a system and method for capturing views of a mixed reality environment from various perspectives which can be displayed on a monitor. The system includes one or more physical cameras at user-defined positions within the mixed reality environment. The system time syncs with the one or more physical cameras, and renders virtual objects in the mixed reality environment from the perspective of the one or more cameras. Real and virtual objects from the mixed reality environment may then be displayed from the perspective of the one or more cameras on one or more external, 2D monitor for viewing by others.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present technology will now be described with reference to the figures, which in general relate to a system and method for capturing views of a mixed reality environment from various perspectives which can be displayed on a monitor to an unlimited number of people. The system includes one or more physical cameras at user-defined positions within the mixed reality environment. The system time syncs with the one or more physical cameras, and renders the mixed reality environment from the perspective of the one or more cameras. The scene may then be displayed on one or more external, 2D monitor for viewing by others.

Figure 1:
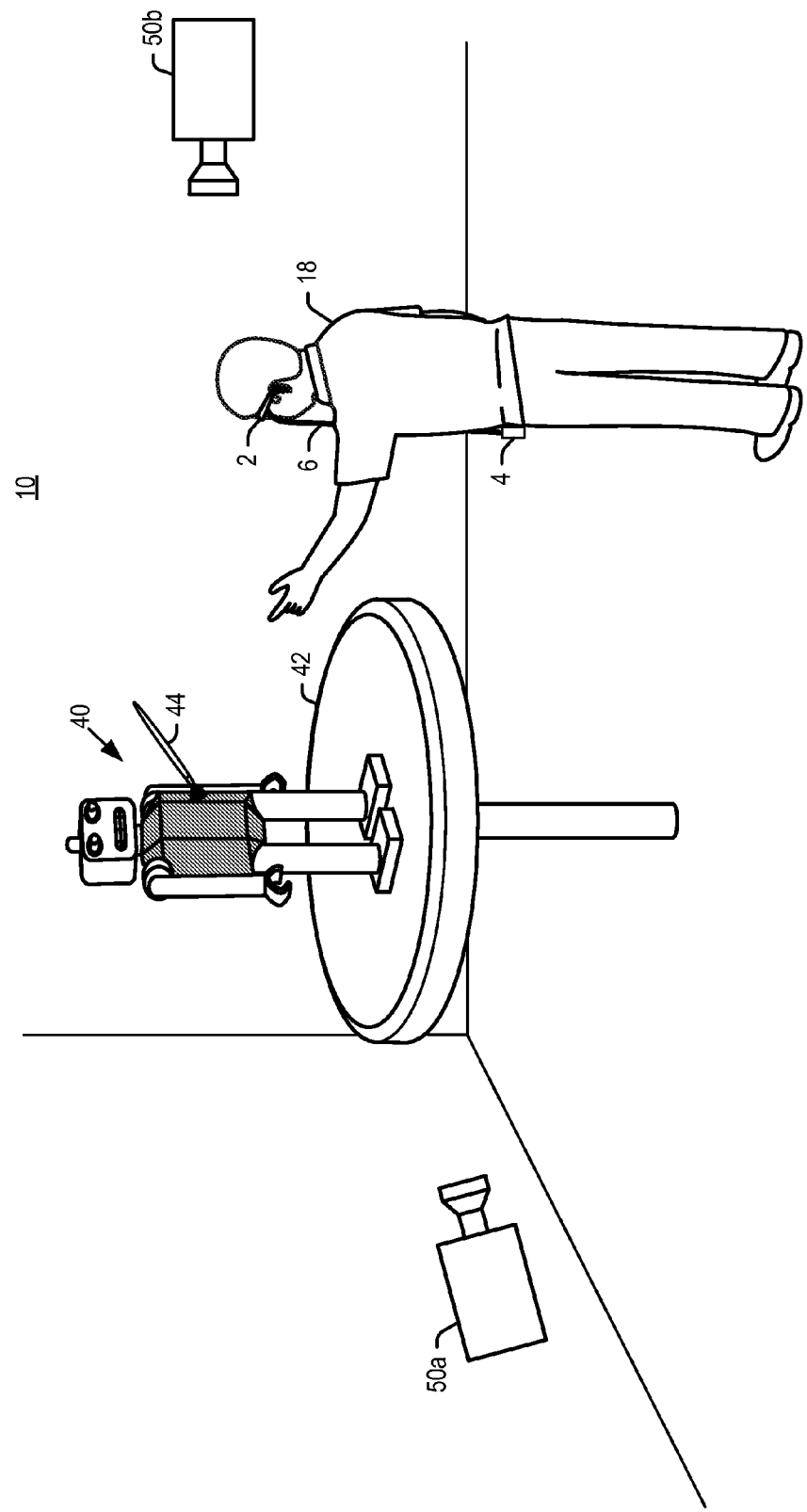
FIG. 1 is an illustration of a virtual reality environment including real and virtual objects.

FIG. 1 illustrates a mixed reality environment 10 including virtual objects mixed with real world objects. In embodiments, the present technology may be used in conjunction with a content generation software application for generating virtual objects. In the example shown, a user 18 is generating virtual content 40, in this example, a virtual robot. The virtual robot is being constructed on a table 42, which may be real or virtual. In the example shown, the user is applying a virtual tool 44, in this example, a painting tool, for coloring portions of the robot. The present technology for displaying virtual and real content from the perspective of one or more cameras may be used with a wide variety of mixed reality applications other than content generation applications.

The mixed reality environment including the virtual and real objects may be viewed by the user 18 via a head mounted display device 2 working in conjunction with a processing unit 4. The head mounted display device 2 may communicate with the processing unit 4 via a flexible cable 6. The head mounted display device may alternatively communicate wirelessly with the processing unit 4. In further embodiments, the processing unit 4 may be integrated into the head mounted display device 2. Head mounted display device 2, which in one embodiment is in the shape of glasses, is worn on the head of a user so that the user can see through a display and thereby have an actual direct view of the space in front of the user. More details of the head mounted display device 2 and processing unit 4 are provided below.

The processing unit 4 may include hardware components and/or software components to execute applications such as gaming applications, non-gaming applications, or the like. In one embodiment, processing unit 4 may include a processor such as a standardized processor, a specialized processor, a microprocessor, or the like that may execute instructions stored on a processor readable storage device for performing the processes described herein. In embodiments, the processing unit 4 may communicate wirelessly (e.g., WiFi, Bluetooth, infra-red, or other wireless communication means) to one or more remote computing systems. These remote computing systems may include a computer, a gaming system or console, or remote service provider.

The head mounted display device 2 and processing unit 4 may cooperate with each other to present virtual objects, e.g., objects 40, 44, to a user in a mixed reality environment 10. In accordance with aspects of the present technology, the mixed reality environment 10 may further include one or more camera assemblies 50 which may be used to generate views of the mixed reality environment 10 that can be displayed on an external monitor for viewing by others.

Specifically, the camera assemblies 50 may be used to generate views of the mixed reality environment 10 including virtual and real objects, that can be viewed on the monitor by others not wearing a head mounted display device 2.

In the example shown, the camera assemblies 50 include camera assemblies 50a and 50b. However, it is understood that the present technology may operate with a single camera assembly 50 or more than two camera assemblies 50 in further embodiments. When a particular camera view is selected, the virtual objects and real objects in the mixed reality environment may be displayed on the external monitor, from the perspective of the selected camera assembly. That is, real world objects may be displayed on the monitor from the viewing perspective of the physical location of the selected camera assembly. And virtual objects may be displayed on the monitor from the viewing perspective of the physical location of the selected camera assembly.

Figure 2:
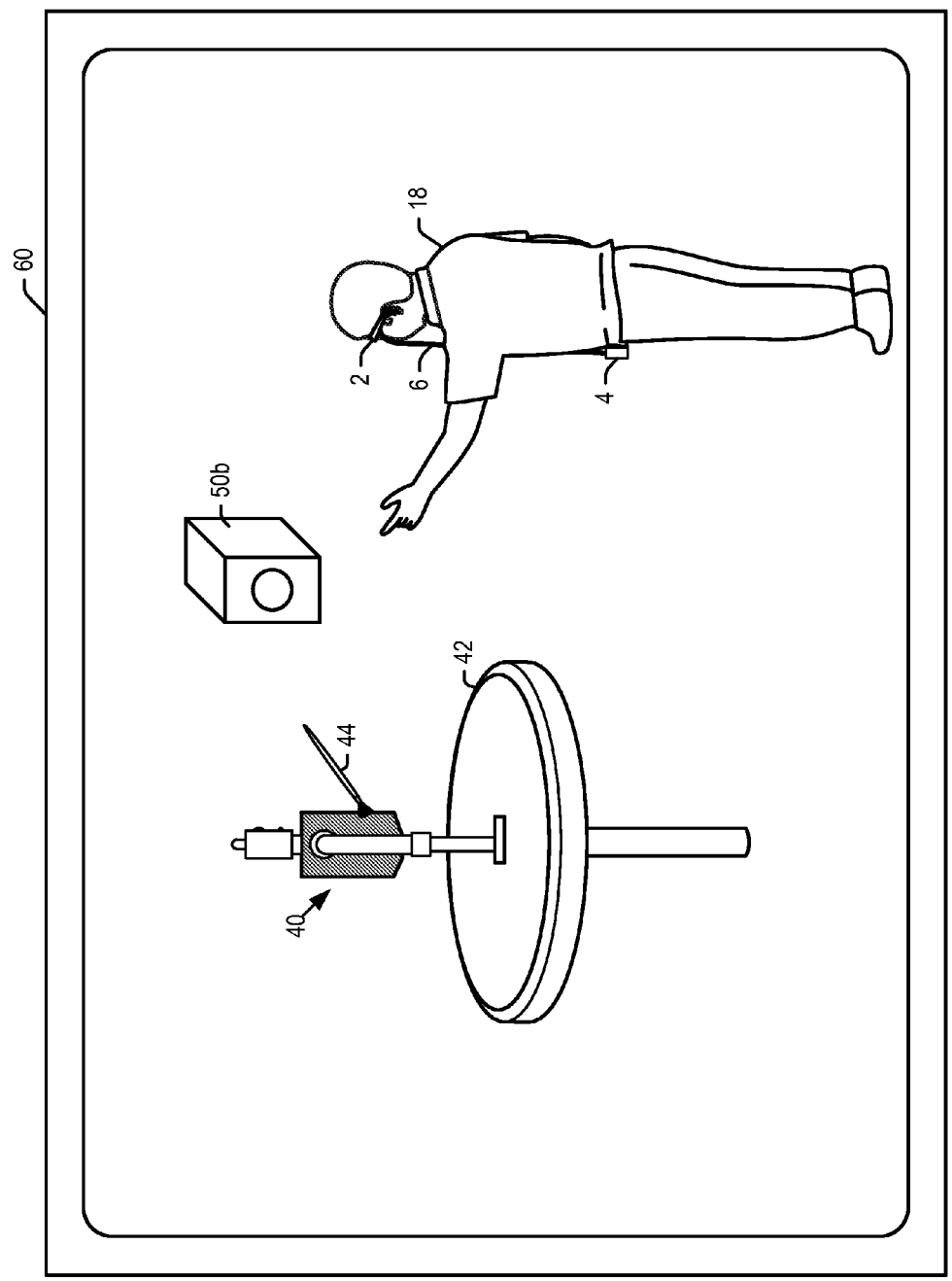
FIG. 2 is a display on a monitor of a mixed reality environment captured by a camera assembly of FIG. 1

For example, if camera assembly 50a were selected, the view of the mixed reality environment would be from the perspective of the physical location of camera assembly 50a, as shown in FIG. 2. Real world objects, such as for example user 18 camera assembly 50b and possibly table 42, are within the frustum view of camera assembly 50a. Thus, the image captured of such real world objects by camera assembly 50a may be displayed on a monitor 60 from the perspective of camera assembly 50a. It is understood that multiple camera assemblies may be selected at the same time so that the views of the multiple camera assemblies are shown on one or more monitors 60 at the same time.

Similarly, virtual objects within the mixed reality environment have defined positions in three-dimensional space, and may be viewed from different angles and sides, depending on the viewing perspective from which the virtual objects are viewed. In FIG. 2, virtual objects, such as virtual content 40 and virtual tool 44 are within the frustum view of the camera assembly 50a. Thus, such virtual objects may be displayed on the monitor 60 from the position in three-dimensional space coinciding with the position of the camera assembly 50a. The result is a view of the mixed reality environment 10 on the monitor 60 from the perspective of the camera assembly 50a. In FIG. 1, the virtual and real objects are shown from a given perspective. This perspective may be seen for example through a second head mounted display device 2 (not shown) worn by another user. This perspective may alternatively be seen for example on the monitor 60 captured from the position of a third camera assembly 50 (not shown).

In embodiments, the processing unit 4 (working alone or in combination with other processing units) may build a model of the environment including the x, y, z Cartesian positions of users, real world objects and virtual three-dimensional objects in the room or other environment. The positions of each head mounted display device 2 may be calibrated to the model of the mixed reality environment as explained below. The positions of each camera assembly 50 may also be calibrated to the model of the mixed reality environment as explained below. In further embodiments, the positions of the one or more head mounted display devices 2 and camera assemblies 50 may be calibrated to each other, instead of to the mixed reality environment. The three-dimensional model of the environment, referred to herein as a scene map, as well as all tracking of each user's FOV, each camera assembly's frustum, and objects in the environment may be generated by the mobile processing unit 4 by itself, or working in tandem with other processing devices as explained hereinafter.

These calibration operations allows the system to determine each user's line of sight and FOV of the mixed reality environment, and each camera assembly's line of sight and frustum view of the mixed reality environment. Thus, a virtual image may be displayed to each user, but the system determines the display of the virtual image from each user's perspective or camera assembly's perspective. Additionally, as explained below, the head mounted display devices 2 and camera assemblies 50 may include depth sensors and/or other image sensors. These sensors are able to determine whether a first virtual object is occluding, or is occluded by, a second virtual object or real object from a given device 2 or camera assembly 50 perspective.

Figure 3:
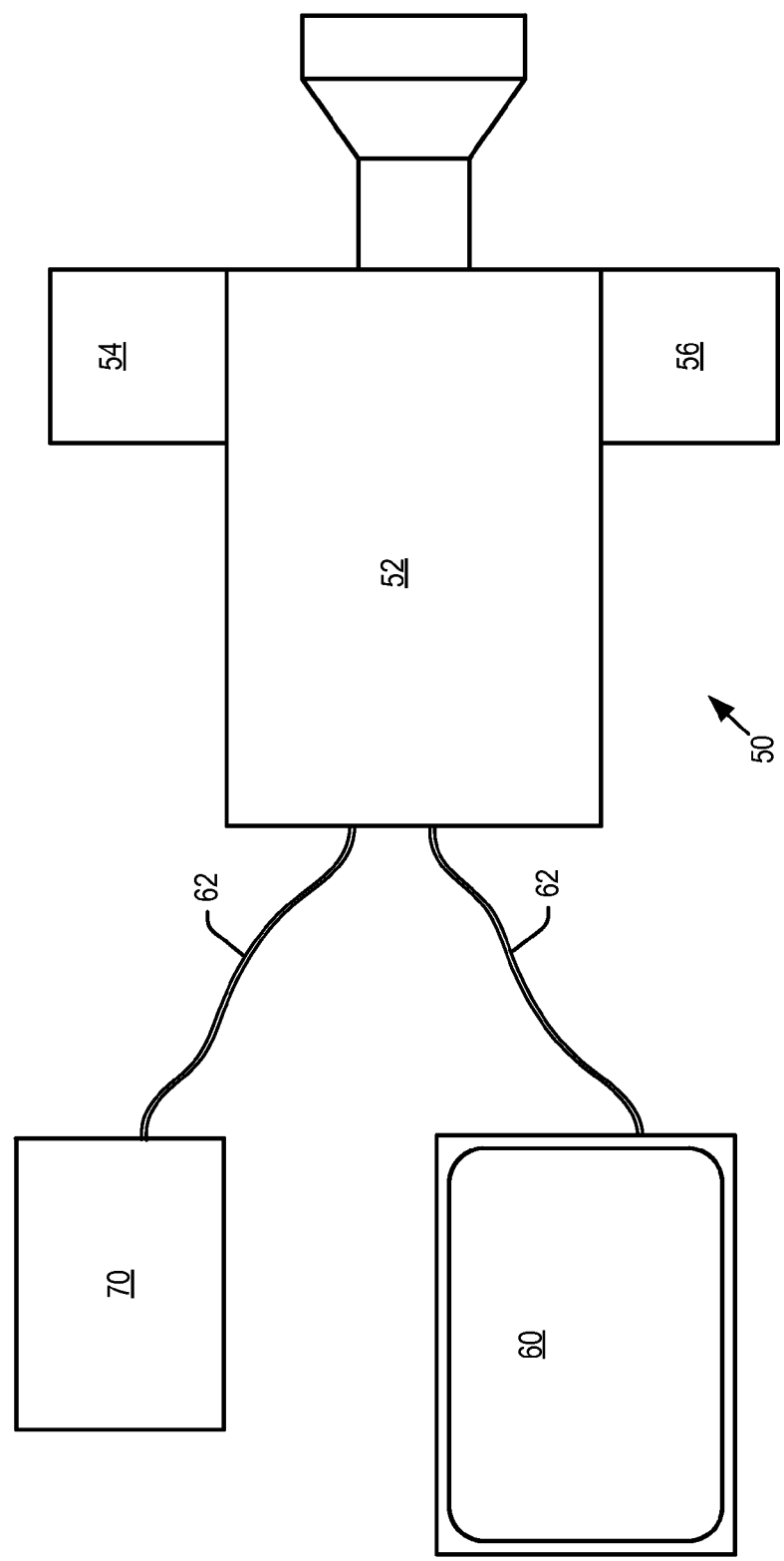
FIG. 3 is a block diagram of a camera assembly according to embodiments of the present technology.

FIG. 3 is a schematic block diagram of a camera assembly 50 in communication with an external monitor 60 and a computing system 70. Computing system 70 may be or include processing unit 4, or alternatively, computing system 70 may work together with processing unit 4. The camera assembly 50 shown in FIG. 3 may be any of the camera assemblies 50 described herein. The one or more camera assemblies 50 may be located anywhere within or around the mixed reality environment 10, to capture the real and/or virtual objects within the mixed reality environment 10 from any angle. Camera assemblies 50 may for example be mounted on tripods, or otherwise supported at desired positions in or around the mixed reality environment to provide a birds-eye view of the mixed reality environment. A bird's eye view is a view of the mixed reality environment from the sides, below, above or within the mixed reality environment. The camera assemblies may be in fixed positions, or they may move around within a mixed reality environment.

Camera assembly 50 includes a camera 52, position sensor 54 and an image sensor 56. Camera assembly 50 may include additional components in further embodiments. Camera 52 may be a video camera such as for example the Scarlet® camera from Red.com, Inc. of Irvine, Calif. Other video cameras are contemplated. In embodiments, the camera 52 may capture video of dynamic real objects and display them as they move or change. In further embodiments, the camera 52 of camera assembly 50 may alternatively or additionally capture still images of the real objects.

Position sensor 54 may be used to calibrate the position of camera assembly 50 within the mixed reality environment 10 relative to virtual objects, other camera assemblies 50 and/or head mounted display devices 2. In examples, position sensor 54 may be an inertial measurement unit similar to inertial measurement unit 132 described below. The inertial measurement unit of position sensor 54 may include inertial sensors such as a three axis magnetometer, a three axis gyro and/or a three axis accelerometer. The inertial measurement unit senses position, orientation, and sudden accelerations (pitch, roll and yaw) of the camera assembly 50. A position and orientation of the camera assembly 50 (or head mounted display device 2) are referred to herein as a pose of the camera assembly 50 (or head mounted display device 2). The inertial measurement unit may include other inertial sensors in addition to or instead of the magnetometer, gyro and accelerometer.

The inertial measurement unit of position sensor 54 may be used to determine the position and orientation of the camera assembly 50, for example using the known position and orientation of the camera assembly 50 from an earlier time. The inertial information from the inertial measurement unit may then be used to update the position and orientation of the camera assembly 50. Information from the inertial measurement unit may provide accurate kinematic data for the camera assembly, but the inertial measurement unit typically does not provide absolute position information regarding camera assembly position. This absolute position information, also referred to as "ground truth," may be provided from the image data obtained from the camera 52 and/or image sensor 56 of the camera assembly 50.

As explained below, the head mounted device 2 includes inertial measurement unit 132. As such, in embodiments, position sensor 54 may be or include a head mounted display device 2 affixed to the camera 52. In such embodiments, the inertial measurement unit 132 (and possibly some of the other assemblies described below) may be active as part of position sensor 54, and other assemblies described below (for example micro display 120) may be disabled or otherwise inactive.

Image sensor 56 may be used to obtain depth data from the camera assembly 50 to real world objects within the mixed reality environment 10. In embodiments, the image sensor 56 may be a Kinect® camera used for example with the Xbox One® platform from Microsoft Corporation of Redmond, Wash. Data from image sensor 56 may be used to implement an opacity filter, identical to opacity filter 114 described below with respect to the head mounted display device 2. Such opacity filters ensure that virtual objects which are partially or fully blocked from view from the perspective of the camera assembly 50 are displayed with the proper occlusions.

The camera assembly 50 may communicate with the monitor 60 via cable 62. The monitor 60 may for example be a television, a monitor, a high-definition television (HDTV), or the like that may provide video and/or audio to a user. For example, the camera assembly 50 may include a video adapter such as a graphics card and/or an audio adapter such as a sound card that may provide audio/visual signals associated with the mixed reality environment 10. The monitor 60 may receive the audio/visual signals from the camera assembly 50 and may then output the video and/or audio associated with the audio/visual signals to any number of people watching monitor 60. The monitor may be a two-dimensional or three-dimensional monitor. In further embodiments, instead of sending the feed from a camera assembly 50 to a monitor, it may be sent to a head mounted display device 2. This device 2 may be worn by the user 18 present in the environment where the one or more camera assemblies 50 are, or it may be remote and worn by a user other than user 18.

All of the camera assemblies 50 may be connected to a single monitor 60. Moreover, instead of a single monitor 60, it is understood that one or more of camera assemblies 50 may output audio/video signals to a large number of monitors 60. In embodiments, it is contemplated that there be two monitors 60, one displaying the raw camera feed (including only real world objects), and the second showing the same raw camera feed, but further displaying the virtual objects fused with the raw camera feed. According to one embodiment, the monitor 60 may be connected to the camera assembly 50 via cable 62, which may be, for example, an SDI video cable, an S-Video cable, a coaxial cable, an HDMI cable, a DVI cable, a VGA cable, a component video cable, or the like. Feed from a camera assembly 50 may be sent to a monitor for real-time display, or it may be recorded for later playback (with any virtual objects being stored for later playback as well). Instead of sending the feed to an attached monitor 60, the feed may be stored on a webserver and made accessible as a web stream, or otherwise broadcast to a remote location.

As explained below, the head mounted display device 2 and processing unit 4 may be used to define a scene map including the three-dimensional coordinates of virtual objects, real objects and the camera assemblies within the mixed reality environment 10. However, in embodiments, the one or more camera assemblies 50 working in conjunction with the processing unit 4 and/or a computing system 70 may assist in determining the scene map. Where computing system 70 is separate from the processing unit 4, computing system 70 may be coupled to the camera assembly 50, for example with a cable 62 as described above. In further embodiments (where the computing system 70 is the same as or different from the processing unit 4), the computing system 70 may be remote from the camera assembly 50, and connected thereto by some other wired or wireless network. The computing system 70 may be communication with all camera assemblies 50 and/or head mounted display devices 2.

Figure 4:
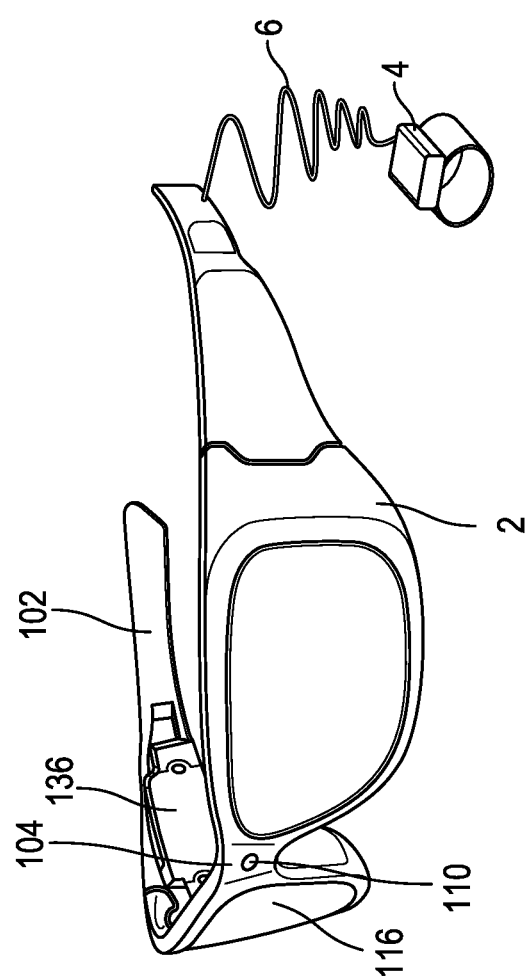
FIG. 4 is a perspective view of one embodiment of a head mounted display unit.
Figure 5:
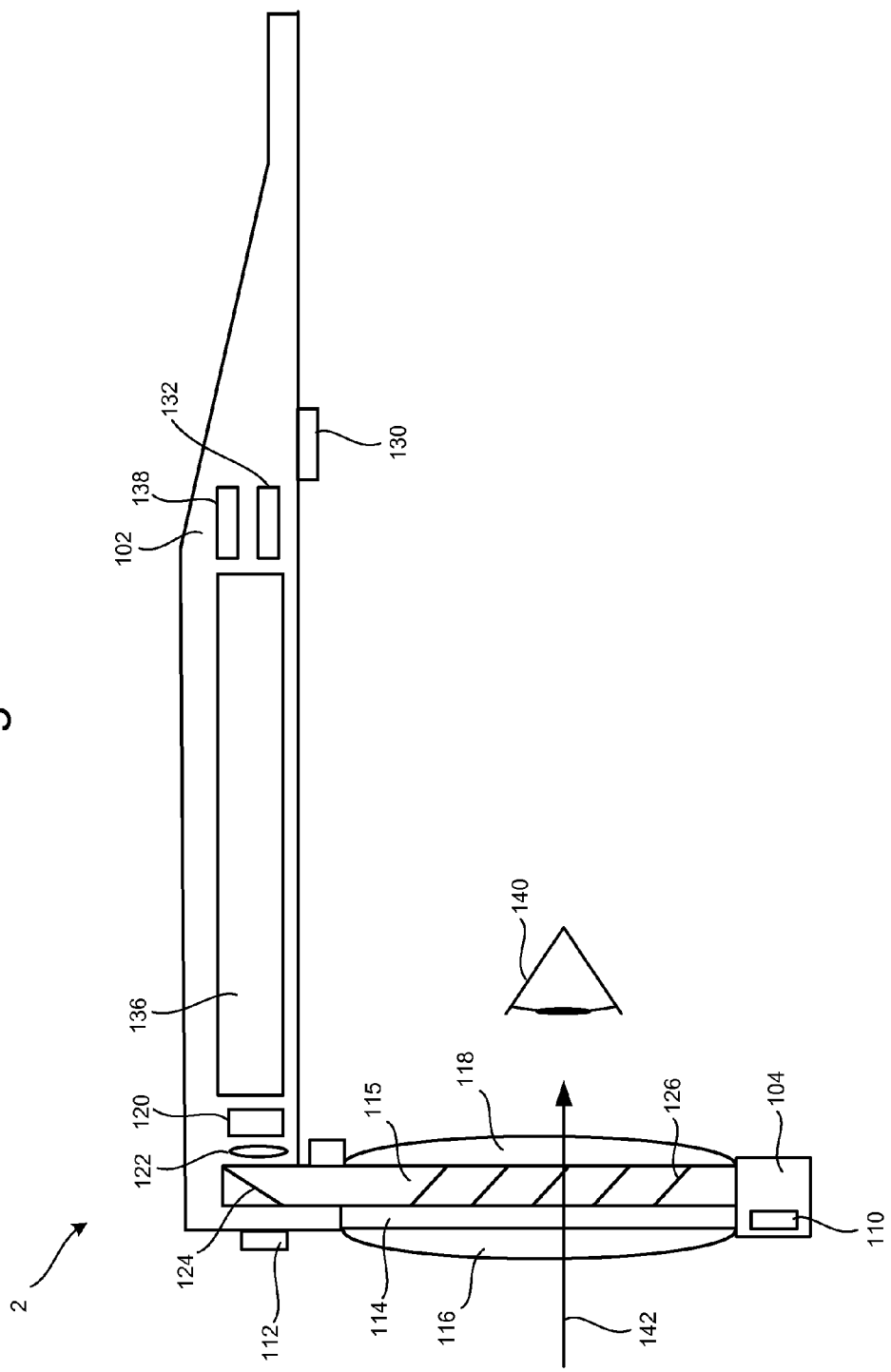
FIG. 5 is a side view of a portion of one embodiment of a head mounted display unit.

FIGS. 4 and 5 show perspective and side views of the head mounted display device 2. FIG. 5 shows only the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). In one embodiment, see-through lenses 116 and 118 can be replaced by a variable prescription lens. Opacity filter 114 filters out natural light (either on a per pixel basis or uniformly) to enhance the contrast of the virtual imagery. Light-guide optical element 115 channels artificial light to the eye. More details of opacity filter 114 and light-guide optical element 115 are provided below.

Mounted to or inside temple 102 is an image source, which (in one embodiment) includes microdisplay 120 for projecting a virtual image and lens 122 for directing images from microdisplay 120 into light-guide optical element 115. In one embodiment, lens 122 is a collimating lens.

Control circuits 136 provide various electronics that support the other components of head mounted display device 2. More details of control circuits 136 are provided below with respect to FIG. 6. Inside or mounted to temple 102 are ear phones 130, inertial measurement unit 132 and temperature sensor 138. In one embodiment shown in FIG. 6, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 2. The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user.

As different light rays will travel and bounce off the inside of the substrate at different angles, the different rays will hit the various reflecting surfaces 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light-guide optical element can be found in United States Patent Publication No. 2008/0285140, entitled "Substrate-Guided Optical Devices," published on Nov. 20, 2008. In one embodiment, each eye will have its own light-guide optical element 115. When the head mounted display device 2 has two light-guide optical elements, each eye can have its own microdisplay 120 that can display the same image in both eyes or different images in the two eyes. In another embodiment, there can be one light-guide optical element which reflects light into both eyes.

Opacity filter 114, which is aligned with light-guide optical element 115, selectively blocks natural light, either uniformly or on a per-pixel basis, from passing through light-guide optical element 115. Details of an example of opacity filter 114 are provided in U.S. Patent Publication No. 2012/0068913 to Bar-Zeev et al., entitled "Opacity Filter For See-Through Mounted Display," filed on Sep. 21, 2010. However, in general, an embodiment of the opacity filter 114 can be a see-through LCD panel, an electrochromic film, or similar device which is capable of serving as an opacity filter. Opacity filter 114 can include a dense grid of pixels, where the light transmissivity of each pixel is individually controllable between minimum and maximum transmissivities. While a transmissivity range of 0-100% is ideal, more limited ranges are also acceptable, such as for example about 50% to 90% per pixel.

A mask of alpha values can be used from a rendering pipeline, after z-buffering with proxies for real-world objects. When the system renders a scene for the mixed reality display, it takes note of which real-world objects are in front of which virtual objects as explained below. If a virtual object is in front of a real-world object, then the opacity may be on for the coverage area of the virtual object. If the virtual object is (virtually) behind a real-world object, then the opacity may be off, as well as any color for that pixel, so the user will see just the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs.

Head mounted display device 2 also includes a system for tracking the position of the user's eyes. As will be explained below, the system will track the user's position and orientation so that the system can determine the FOV of the user. In alternative embodiments, the system may include technology for tracking the position of the user's eyes in order to refine the measurement of the FOV of the user. For example, head mounted display device 2 may include an eye tracking assembly (not shown), which has an eye tracking illumination device and eye tracking camera. In one embodiment, the eye tracking illumination device includes one or more infrared (IR) emitters, which emit IR light toward the eye. The eye tracking camera includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

FIG. 5 only shows half of the head mounted display device 2. A full head mounted display device may include another set of see-through lenses, another opacity filter, another light-guide optical element, another microdisplay 120, another lens 122, room-facing camera, earphones, and temperature sensor.

Figure 6:
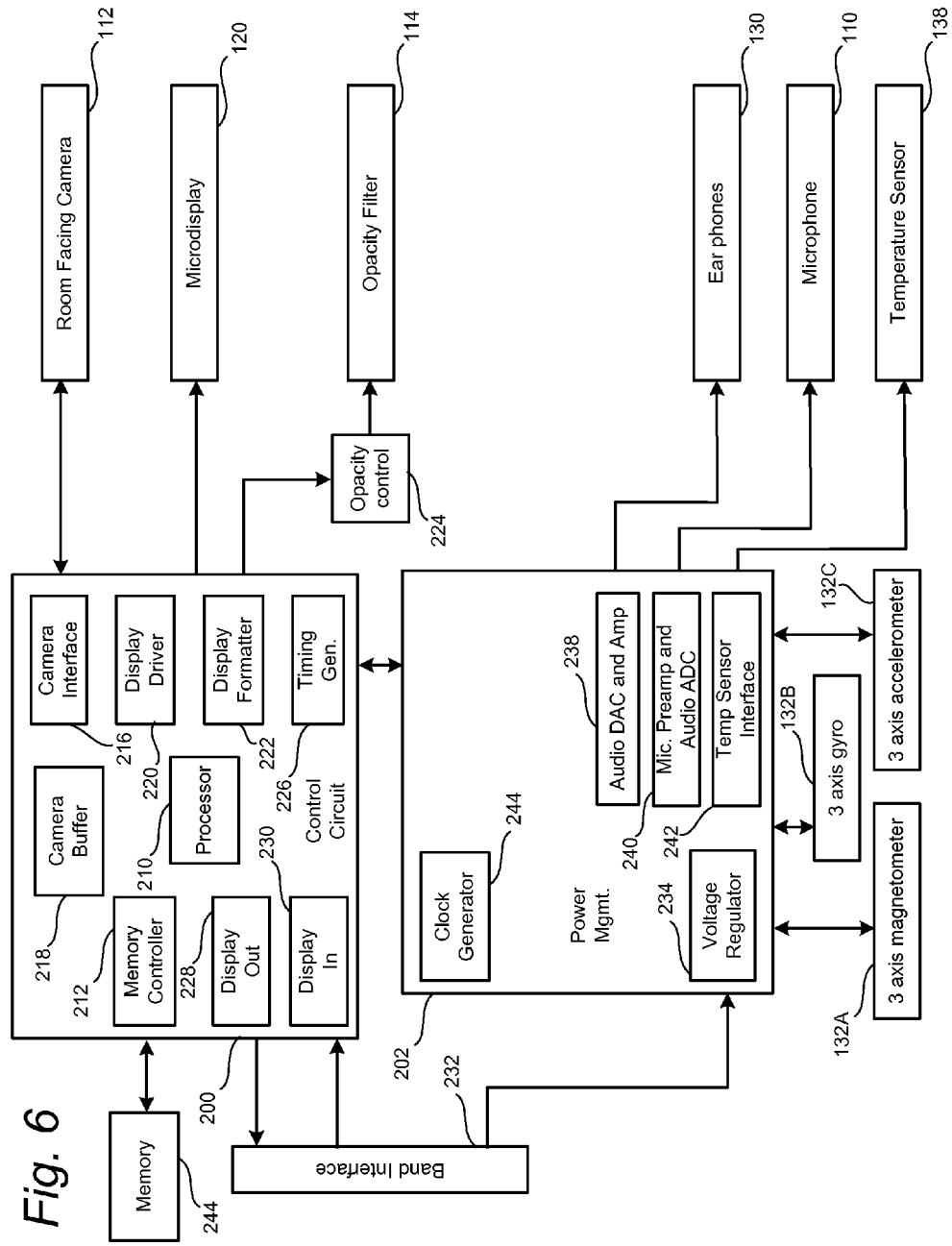
FIG. 6 is a block diagram of one embodiment of the components of a head mounted display unit.
Figure 7:
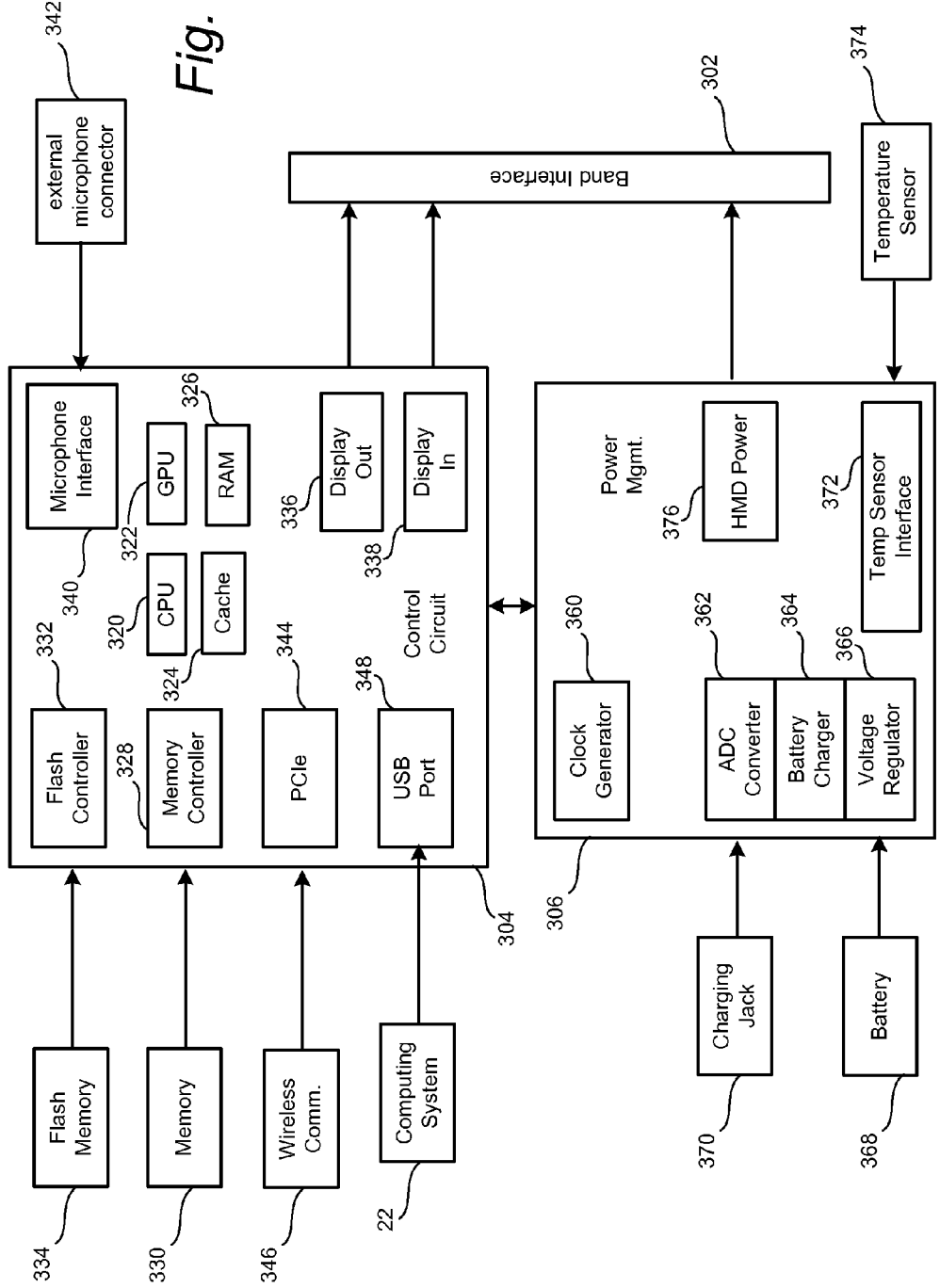
FIG. 7 is a block diagram of one embodiment of the components of a processing unit associated with a head mounted display unit.

FIG. 6 is a block diagram depicting the various components of head mounted display device 2. FIG. 7 is a block diagram describing the various components of processing unit 4. Head mounted display device 2, the components of which are depicted in FIG. 6, is used to provide a virtual experience to the user by fusing one or more virtual images seamlessly with the user's view of the real world. Additionally, the head mounted display device components of FIG. 6 include many sensors that track various conditions. Head mounted display device 2 will receive instructions about the virtual image from processing unit 4 and will provide the sensor information back to processing unit 4. Processing unit 4 may determine where and when to provide a virtual image to the user and send instructions accordingly to the head mounted display device of FIG. 6.

Some of the components of FIG. 6 (e.g., room-facing camera 112, microdisplay 120, opacity filter 114, earphones 130, and temperature sensor 138) are shown in shadow to indicate that there are two of each of those devices, one for the left side and one for the right side of head mounted display device 2. FIG. 6 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, the components of control circuit 200 are in communication with each other via dedicated lines or one or more buses. In another embodiment, the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual image to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 7 is a block diagram describing the various components of processing unit 4. FIG. 7 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to processing unit computing system 22 in order to load data or software onto processing unit 4, as well as charge processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

Figure 8:
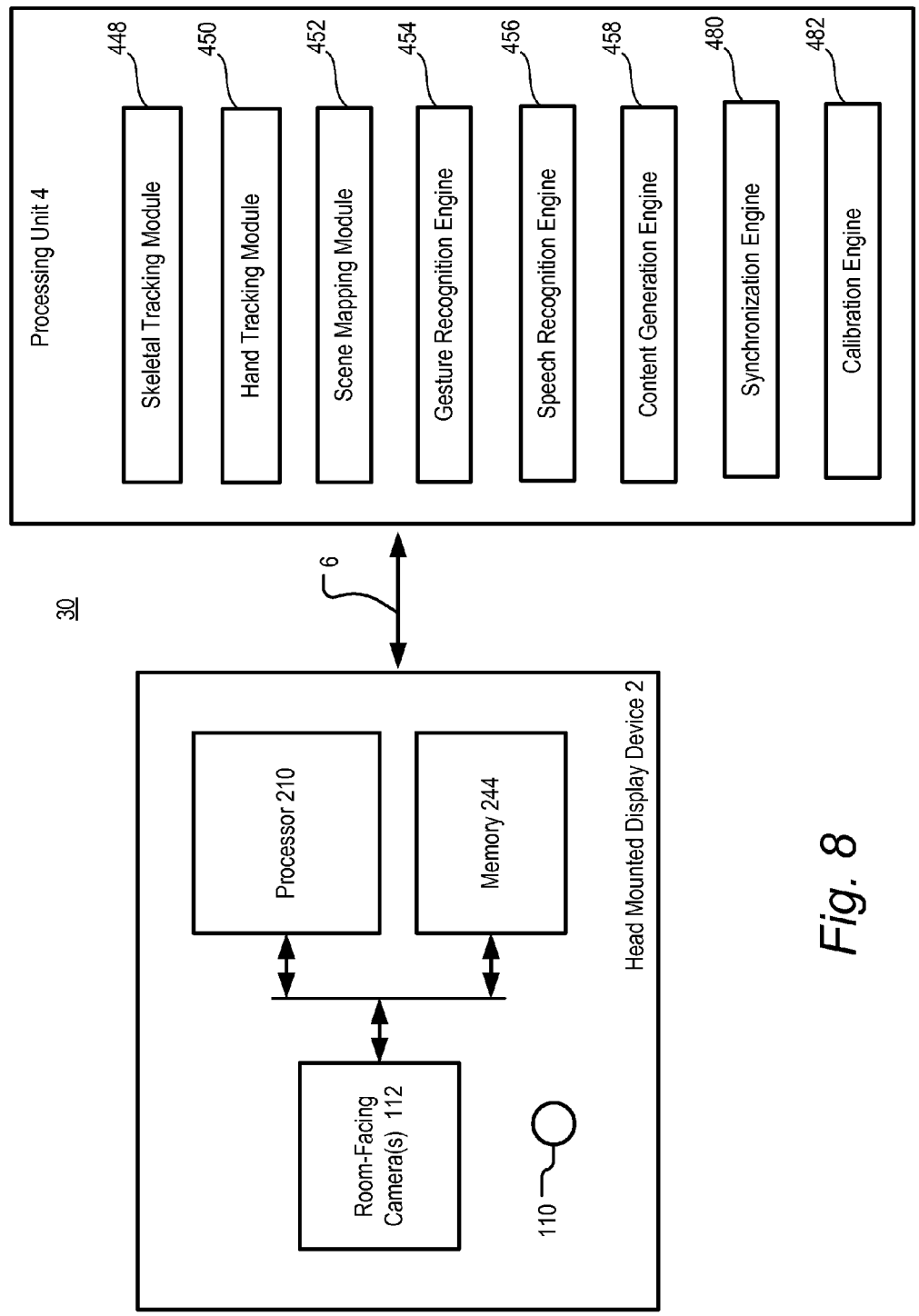
FIG. 8 is a block diagram of one embodiment of the software components of a processing unit associated with the head mounted display unit.

FIG. 8 illustrates a high-level block diagram of the mobile mixed reality assembly 30 including the room-facing camera 112 of the display device 2 and some of the software modules on the processing unit 4. Some or all of these software modules may alternatively be implemented on a processor 210 of the head mounted display device 2.

As shown, the room-facing camera 112 provides image data to the processor 210 in the head mounted display device 2. In one embodiment, the room-facing camera 112 may include a depth camera, an RGB color image camera and an IR light component to capture image data of a scene. As explained below, the room-facing camera 112 may include less than all of these components.

Using for example time-of-flight analysis, the IR light component may emit an infrared light onto the scene and may then use sensors (not shown) to detect the backscattered light from the surface of one or more objects in the scene using, for example, the depth camera and/or the RGB camera. In some embodiments, pulsed infrared light may be used such that the time between an outgoing light pulse and a corresponding incoming light pulse may be measured and used to determine a physical distance from the room-facing camera 112 to a particular location on the objects in the scene, including for example a user's hands. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the room-facing camera 112 to a particular location on the objects by analyzing the intensity of the reflected beam of light over time via various techniques including, for example, shuttered light pulse imaging.

In another example embodiment, the room-facing camera 112 may use a structured light to capture depth information.

In such an analysis, patterned light (i.e., light displayed as a known pattern such as a grid pattern, a stripe pattern, or different pattern) may be projected onto the scene via, for example, the IR light component. Upon striking the surface of one or more targets or objects in the scene, the pattern may become deformed in response. Such a deformation of the pattern may be captured by, for example, the 3-D camera and/or the RGB camera (and/or other sensor) and may then be analyzed to determine a physical distance from the room-facing camera 112 to a particular location on the objects. In some implementations, the IR light component is displaced from the depth and/or RGB cameras so triangulation can be used to determined distance from depth and/or RGB cameras. In some implementations, the room-facing camera 112 may include a dedicated IR sensor to sense the IR light, or a sensor with an IR filter.

It is understood that the present technology may sense objects and three-dimensional positions of the objects without each of a depth camera, RGB camera and IR light component. In embodiments, the room-facing camera 112 may for example work with just a standard image camera (RGB or black and white). Such embodiments may operate by a variety of image tracking techniques used individually or in combination. For example, a single, standard image room-facing camera 112 may use feature identification and tracking. That is, using the image data from the standard camera, it is possible to extract interesting regions, or features, of the scene. By looking for those same features over a period of time, information for the objects may be determined in three-dimensional space.

In embodiments, the head mounted display device 2 may include two spaced apart standard image room-facing cameras 112. In this instance, depth to objects in the scene may be determined by the stereo effect of the two cameras. Each camera can image some overlapping set of features, and depth can be computed from the parallax difference in their views.

A further method for determining a scene map with positional information within an unknown environment is known as simultaneous localization and mapping (SLAM). One example of SLAM is disclosed in U.S. Pat. No. 7,774,158, entitled "Systems and Methods for Landmark Generation for Visual Simultaneous Localization and Mapping." Additionally, data from the IMU 132 can be used to interpret visual tracking data more accurately.

The processing unit 4 may include a scene mapping module 452. Using the data from the front-facing camera(s) 112 as described above, the scene mapping module is able to map objects in the scene (including one or both of the user's hands) to a three-dimensional frame of reference. Further details of the scene mapping module are described below.

In order to track the position of users within a scene, users may be recognized from image data. The processing unit 4 may implement a skeletal recognition and tracking module 448. An example of a skeletal tracking module 448 is disclosed in U.S. Patent Publication No. 2012/0162065, entitled, "Skeletal Joint Recognition And Tracking System," filed Mar. 2, 2012. Such systems may also track a user's hands. However, in embodiments, the processing unit 4 may further execute a hand recognition and tracking module 450. The module 450 receives the image data from the room-facing camera 112 and is able to identify a user's hand, and a position of the user's hand, in the FOV. An example of the hand recognition and tracking module 450 is disclosed in U.S. Patent Publication No. 2012/0308140, entitled, "System for Recognizing an Open or Closed Hand," filed Nov. 18, 2011. In general the module 450 may examine the image data to discern width and length of objects which may be fingers, spaces between fingers and valleys where fingers come together so as to identify and track a user's hands in their various positions.

The processing unit 4 may further include a gesture recognition engine 454 for receiving skeletal model and/or hand data for one or more users in the scene and determining whether the user is performing a predefined gesture or application-control movement affecting an application running on the processing unit 4. More information about gesture recognition engine 454 can be found in U.S. patent application Ser. No. 12/422,661, entitled "Gesture Recognizer System Architecture," filed on Apr. 13, 2009.

As mentioned above, a user may perform various verbal gestures, for example in the form of spoken commands to select objects and possibly modify those objects. Accordingly, the present system further includes a speech recognition engine 456. The speech recognition engine 456 may operate according to any of various known technologies.

The processing unit 4 may further implement a synchronization software engine 480 and a calibration software engine 482 for calibrating the one or more head mounted display devices 2 and camera assemblies 50 to the scene map. The operation of the synchronization engine 480 and calibration engine 482 is explained below.

As noted above, camera assembly 50 includes an image sensor 56. In one embodiment, the image sensor 56 may include a depth camera and an IR light component to capture image data of a scene. Using these components, the image sensor 56 may capture depth data of the scene, from the perspective of the camera assembly 50, according to any of the above-described methods by which room-facing cameras 112 capture image data. It is further understood that image sensor 56 may build a scene map by any of a variety of other technologies, using for example depth sensors alone, RGB cameras alone, black and white cameras alone or two or more of these sensors/cameras working together. For example, depth data may be generated using two color cameras and stereo analysis. Such scene maps may be built using data from a single camera assembly, or a plurality of camera assemblies (and possibly head mounted display devices 2) working together.

As noted above, camera assembly 50 may communicate with a computing system 70. Where computing system 70 and processing unit 4 are separate from each other, computing system 70 may execute some or all of the processing unit 4 software modules 448, 450, 452, 454, 456, 480 and/or 482, described above with respect to FIG. 8, instead of or in addition to the processing unit 4.

In one example embodiment, the head mounted display device 2 and processing unit 4 work together to create the scene map or model of the environment that the user is in and tracks various moving or stationary objects in that environment. In embodiments, data from the sensors of the one or more camera assemblies 50 may assist in generating the scene map. These features are described in greater detail below with respect to the flowchart of FIG. 9.

In addition, the processing unit 4 tracks the FOV of the head mounted display device 2 worn by the user 18 by tracking the position and orientation of the head mounted display device 2. Sensor information, for example from the room-facing cameras 112 and IMU 132, obtained by head mounted display device 2 is transmitted to processing unit 4. The processing unit 4 processes the data and updates the scene model. The processing unit 4 further provides instructions to head mounted display device 2 on where, when and how to insert any virtual three-dimensional objects. In the same manner, the computing system 70 may track the position, orientation and frustum view of the one or more camera assemblies 50, and update the scene model accordingly. These features are also described in greater detail with respect to the flowchart of FIG. 9.

Figure 9:
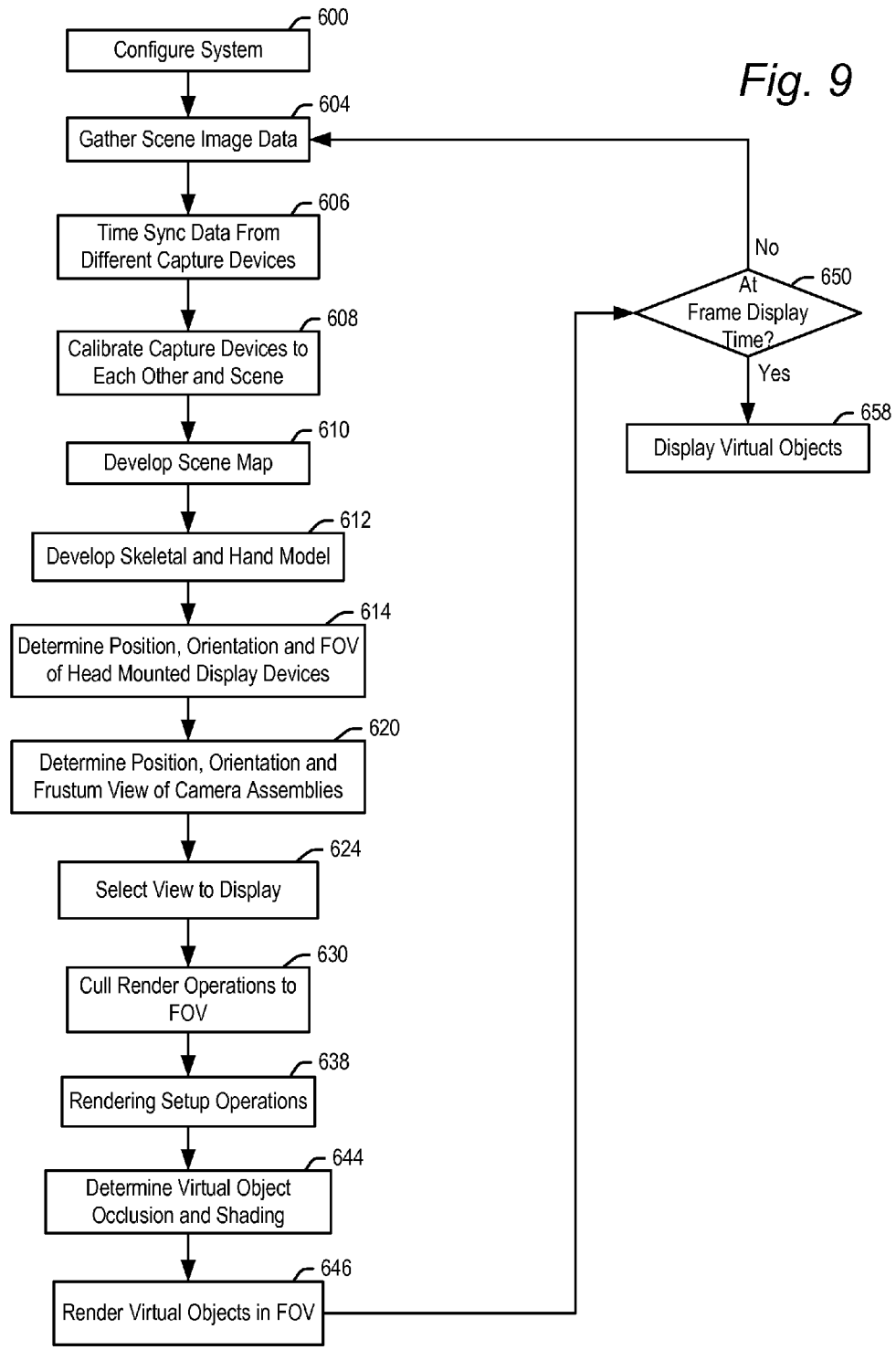
FIG. 9 is a flowchart showing the operation of one or more processing units associated with a head mounted display unit of the present system.

FIG. 9 is a high level flowchart of the operation and interactivity of the processing unit 4, head mounted display device 2, one or more camera assemblies 50 and computing system 70 during a discrete time period such as the time it takes to generate, render and display a single frame of image data. In embodiments, data may be refreshed at a rate of 60 Hz, though it may be refreshed more often or less often in further embodiments.

The system for presenting a virtual environment may be configured in step 600. For example, a user 18 or operator of the system may specify virtual content that is to be presented, and where it is to be presented. Where a user is creating virtual content via the content generation software engine 458, a virtual tool case including a plurality of virtual tools may be opened and displayed.

In steps 604 the processing unit 4 gathers data from the scene. This may be data sensed by the head mounted display device 2, and in particular, by the room-facing cameras 112 and the IMU 132. This may also include image and inertial data sensed by the camera assembly 50, and in particular, by the camera 50, the position sensor 54 and the image sensor 56.

As explained below, the positions of the one or more head mounted display devices 2 and one or more camera assemblies 50 may be calibrated to each other within the scene map. However, it may happen that image data received in the camera 52 and image sensor 56 of the one or more camera assemblies 50, and the room-facing cameras 112 of the one or more head mounted display devices 2, are received at different rates. Thus, before the camera assemblies and head mounted display devices may be calibrated to the scene map, embodiments of the present technology time synchronize the image data received from the image capture devices of the different camera assemblies and head mounted display devices in step 606 to remove time as a variable. This way, the calibration engine 482 can perform its analysis on the image data from the different image capture devices captured at the same time. In the following description, the camera 52, image sensor 56 and/or room facing camera 112 are collectively referred to as image capture devices.

Figure 10:
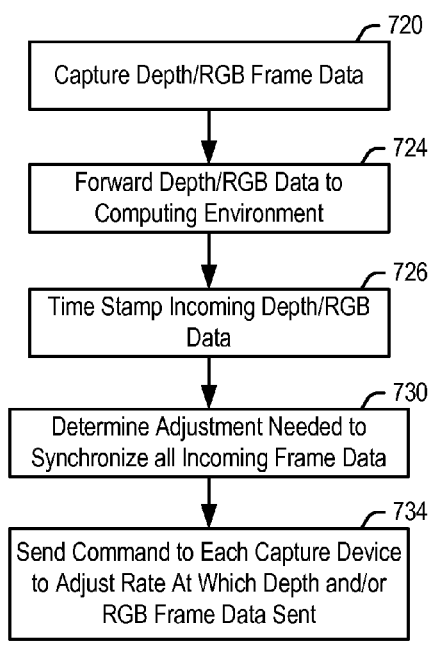
FIGS. 10-12 are more detailed flowcharts of examples of various steps shown in the flowchart of FIG. 9.

The synchronization step 606 is performed by the synchronization engine 480. Further details relating to step 606 are now described with reference to the flowchart of FIG. 10. The following description may be applied to synchronization of data received from the depth cameras and RGB cameras of the different image capture devices. Thus, all image capture devices of the one or more head mounted display devices 2 and one or more camera assemblies 50 may be synchronized together.

Within each image capture device, frames of scene information are captured by the depth camera and RGB camera in step 720. In step 724, the depth and RGB frame data for each capture device are transmitted to the processing unit 4 and/or computing system 70. In step 726, the incoming depth/RGB data is time stamped off a single master clock in either the processing unit 4 or computing system 70.

In step 730, the synchronization engine 480 looks at the frame data received from all of the devices 2 and assemblies 50 for a given frame number. Using the time stamps for such data for a given frame, as well as the known resolution for each of the cameras, the synchronization engine determines the required time offsets for the depth and RGB data from each device/assembly generating the data. From this, the synchronization engine may determine a required adjustment in the timing of each image capture device. The synchronization engine may select as a reference a time stamp from a single device's frame data (e.g., the device that generated the first data for that frame) and set that time stamp as the reference time stamp. The frame data for all other devices may then be adjusted to that reference time stamp. Alternatively, the synchronization engine may generate an internal clock reference, and set the adjustment for all frame data to that internal clock reference.

Once the adjustment for each device is determined in step 730, the synchronization engine may send commands to each device 2/assembly 50 in step 734 to adjust the rate at which that device generates its frame data. There are a variety of mechanisms which may be used for adjusting the generation of frame data. In one embodiment, the synchronization engine may add to or subtract from a blanking interval for the capture devices generating the frame data, so that all frame data from all capture devices is generated and sent at the same time. If the synchronization engine 480 needs to have frames from one device or assembly come in sooner, for example to avoid buffer underflows, it can send a command to the device/assembly to reduce the blanking interval for that device. If the synchronization engine 480 needs to have the frame data for a device or assembly generated later, for example to avoid buffer overflows, it can increase the vertical blanking interval for that device/assembly.

Further details relating to the operation of synchronization engine 480 in step 606 are disclosed in applicant's copending U.S. patent application Ser. No. 12/772,802, entitled "Heterogeneous Image Sensor Synchronization," filed May 3, 2010. Given the disclosure herein, those of skill in the art will appreciate a variety of other operations which may be used for synchronizing the different capture devices of the head mounted display devices 2 and camera assemblies 50 together for the calibration process.

In further embodiments, it is conceivable that synchronization steps may be omitted from the initial calibration process. Such embodiments may make use of motion vectors to predict locations of captured image data points at times other than the capture point. While computationally difficult and processing intensive, such embodiments are possible.

Returning now to FIG. 9, once image data frames are synchronized for a moving scene of data in step 606, the capture devices may be calibrated to each other and the scene in step 608. In the following description, a z-axis is defined straight out from a camera lens, and the x-axis and y-axis are horizontal and vertical offsets, respectively, from the z-axis. This definition of x, y and z axes is by way of example only, and the axes may be oriented differently in further embodiments. Each capture device may have an x, y, z Cartesian space that is different than that of other capture devices. As explained hereinafter, once all capture devices are calibrated, a single 3-D real world Cartesian coordinate system may be defined which includes all of the image capture devices.

In embodiments, the calibration operation is performed by calibration engine 482 using both the depth information and RGB information from the different capture devices. Depth cameras provide information about an x, y and z position of points in an image, but may have low resolution. RGB cameras do not provide depth information in the z direction, but typically have high resolution and texture for discerning discontinuities, or cues, used to correlate one capture device's view to another. Accordingly, embodiments of the present technology may use both depth and RGB cameras from a capture device for the calibration process.

However, while more computationally intensive and depending on objects in the scene, it may be possible to calibrate the capture devices to each other and a scene using only depth information from two or more of the capture devices. Similarly, though more computationally intensive still and depending on the objects in the scene, it may be possible to calibrate devices to each other using only RGB information from two or more capture devices. Technology for calibrating camera views using RGB information alone is described for example in U.S. Patent Publication No. 2007/0110338, entitled "Navigating Images Using Image Based Geometric Alignment and Object Based Controls," published May 17, 2007, which publication is used in the technology of Photosynth™ image recognition software from Microsoft Corporation.

Figure 11:
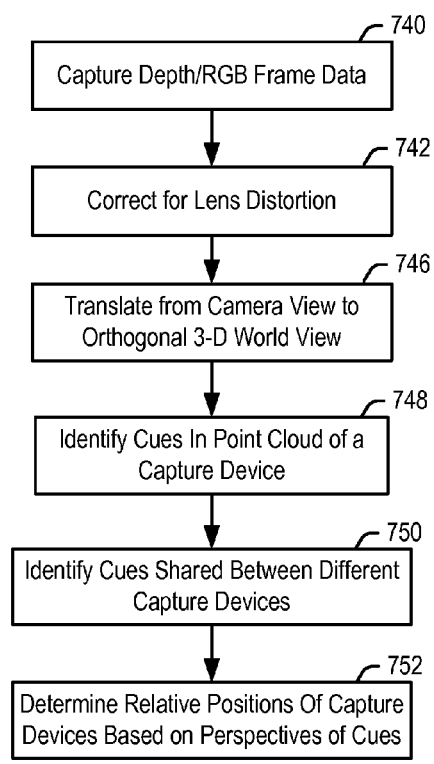

Further details relating to an embodiment of the calibration of the image capture devices by the calibration engine 482 using depth and RGB data is now explained with reference to the flowchart of FIG. 11. In a step 740, the different image capture devices capture depth and RGB image data from a scene. In step 742, the camera view of each depth camera and RGB camera for the different capture devices is converted from a camera-centric view to an orthogonal 3-D world view specific to the generating camera. Some depth cameras measure captured data using a perpendicular frame of reference. That is, the camera defines a plane in a z-direction which increases for objects that are farther away from the camera. The x and y dimensions represent the horizontal and vertical variance from the z-axis. Other depth cameras measure captured data using a radial frame of reference. That is, the camera measures vectors having a first point (x1, y1, z1) at the camera and a second point (x2, y2, z2) at an object.

Regardless of how a camera measures its image data points, ideally the distance between any two adjacent coordinates in the measurement is the same. However, due to camera lens distortion, this will likely not be the case. Accordingly, in step 742, the calibration engine 482 may next correct for camera distortion for both depth and RGB cameras in the image capture devices in devices 2 and assemblies 50. The distortion of a given camera (depth or RGB) may be a known property provided by the camera manufacturer. If not, algorithms are known for calculating a camera's distortion, including for example imaging an object of known dimensions such as a checker board pattern at different locations within a camera's field of view. The deviations in the camera view coordinates of points in that image will be the result of camera lens distortion. Once the degree of lens distortion is known, distortion may be corrected by known inverse matrix transformations that result in a uniform camera view map of points in a point cloud for a given capture device.

The calibration engine 482 may next translate the distortion-corrected image data points captured by a capture device from the camera view to an orthogonal 3-D world view in step 746. This orthogonal 3-D world view is a point cloud map of all data captured by an image capture device in an orthogonal x, y, z Cartesian coordinate system with respect to the capture device (e.g., the capture device may be at (0, 0, 0) in the 3-D world view). The matrix transformation equations for translating camera view to an orthogonal 3-D world view are known. See, for example, David H. Eberly, "3d Game Engine Design: A Practical Approach To Real-Time Computer Graphics," Morgan Kaufman Publishers (2000).

Data from a capture device depth camera may be sufficient to construct the orthogonal 3-D world view in step 746. However, data from a capture device RGB camera may also be used in constructing the 3-D world view in step 746. RGB cameras return a 2-D map of data points, so it is computationally more difficult to derive a 3-D world map from RGB data alone. However, depending on the objects in the scene, it may be possible to construct a 3-D world map from RGB data. See for example, U.S. Patent Publication No. 2007/0110338, previously mentioned.

Each image capture device in the head mounted devices 2 and camera assemblies 50 may construct an orthogonal 3-D world view in step 746. The x, y, z world coordinates of data points from a given capture device are still from the perspective of that capture device at the conclusion of step 746, and not yet correlated to the x, y, z world coordinates of data points from other capture devices in the devices 2 and camera assemblies 50. In further embodiments, the step of correcting for camera lens distortion may be performed after the step 746 of transforming camera view to the orthogonal 3-D world view.

The next step is to translate the various orthogonal 3-D world views of the different image capture devices into a single overall 3-D world view shared by all image capture devices in the head mounted display devices 2 and camera assemblies 50. To accomplish this, embodiments of the calibration engine 482 next look for key-point discontinuities, or cues, in the point clouds of the world views of the respective capture devices in step 748, and then identifies cues that are the same between different point clouds of different capture devices in step 750.

Once the calibration engine 482 is able to determine that two world views of two different capture devices include the same calibration cues, the engine 482 is able to determine the position, orientation and focal length of the two capture devices with respect to each other and the cues in step 752. In embodiments, not all image capture devices in the one or more devices 2 and/or camera assemblies 50 will share the same common cues. However, as long as a first and second capture device have shared cues, and a second and third capture device have shared cues, the calibration engine is able to determine the positions, orientations and focal lengths of the first, second and third capture devices relative to each other and a single, overall 3-D world view. The same is true for additional capture devices.

The first step 748 in this process is to identify cues in a 3-D real world view point cloud for each capture device. A cue may be a data point that is discontinuous with neighboring points, and hence is easily identified between point clouds from different capture devices. Ideally, a number of such cues are identified within each point cloud, and may possibly define an edge and/or a corner of an object within the point cloud. Aspects of other objects within an image point cloud may be cues as well. Various known algorithms exist for identifying cues from an image point cloud. Such algorithms are set forth for example in Mikolajczyk, K., and Schmid, C., "A Performance Evaluation Of Local Descriptors," IEEE Transactions on Pattern Analysis & Machine Intelligence, 27, 10, 1615-1630. (2005). A further method of detecting cues with image data is the Scale-Invariant Feature Transform (SIFT) algorithm. The SIFT algorithm is described for example in U.S. Pat. No. 6,711,293, entitled, "Method and Apparatus for Identifying Scale Invariant Features in an Image and Use of Same for Locating an Object in an Image," issued Mar. 23, 2004 to David G. Lowe. Another cue detector method is the Maximally Stable External Regions (MSER) algorithm. The MSER algorithm is described for example in the paper by J. Matas, O. Chum, M. Urba, and T. Pajdla, "Robust Wide Baseline Stereo From Maximally Stable External Regions," Proc. of British Machine Vision Conference, pages 384-396 (2002).

In step 750, cues which are shared between point clouds from two or more capture devices are identified. Conceptually, where a first set of vectors exist between a first capture device and a set of cues in the first capture device's Cartesian coordinate system, and a second set of vectors exist between a second capture device and that same set of cues in the second capture device's Cartesian coordinate system, the two systems may be resolved with respect to each other into a single Cartesian coordinate system including both capture devices. A number of known techniques exist for finding shared cues between point clouds from two or more capture devices. Such techniques are shown for example in Arya, S., Mount, D. M., Netanyahu, N. S., Silverman, R., and Wu, A. Y., "An Optimal Algorithm For Approximate Nearest Neighbor Searching Fixed Dimensions," Journal of the ACM 45, 6, 891-923 (1998). Other techniques can be used instead of, or in addition to, the approximate nearest neighbor solution of Arya et al., mentioned above, including but not limited to hashing or context-sensitive hashing.

Where the point clouds from two different capture devices share a large enough number of matched cues, a matrix correlating the two point clouds together may be estimated, for example by Random Sampling Consensus (RANSAC), or a variety of other estimation techniques. Matches that are outliers to the recovered fundamental matrix may then be removed. After finding a set of assumed, geometrically consistent matches between a pair of point clouds, the matches may be organized into a set of tracks for the respective point clouds, where a track is a set of mutually matching cues between point clouds. A first track in the set may contain a projection of each common cue in the first point cloud. A second track in the set may contain a projection of each common cue in the second point cloud.

If the cues in respective point clouds form the vertex set of a graph, and there is an edge in the graph between each pair of matching cues, then every connected component of this graph comprises a track. However, the tracks associated with some connected components might be inconsistent; in particular, a track is inconsistent if it contains more than one cue for the same image. In embodiments, only the consistent tracks containing at least two cues are kept for the step 752 of determining relative capture device position, described below.

Using the information from steps 748 and 750, the point clouds from different capture devices may be resolved into a single point cloud in a single orthogonal 3-D real world view. The positions and orientations of all capture devices are calibrated with respect to this single point cloud and single orthogonal 3-D real world view. In order to resolve the various point clouds together, the projections of the cues in the set of tracks for two point clouds are analyzed. From these projections, the calibration engine 482 can determine the perspective of a first capture device with respect to the cues, and can also determine the perspective of a second capture device with respect to the cues. From that, the calibration engine 482 can resolve the point clouds into a best estimate of a single point cloud and single orthogonal 3-D real world view containing the cues and other data points from both point clouds.

This process is repeated for any other capture devices, until the single orthogonal 3-D real world view includes all image capture devices. Once this is done, the calibration engine can determine the relative positions and orientations of the capture devices relative to the single orthogonal 3-D real world view and each other. The calibration engine can further determine the focal length of each capture device with respect to the single orthogonal 3-D real world view.

As an example of the calibration process to determine the pose, lens field of view and distortion parameters for capture devices, two or more capture devices (multiple camera assemblies or one or more camera assembly and the head mounted display device) may capture one or more images of a calibration cue. This calibration cue may be captured from multiple different orientations. The captured images are processed as described above to determine the position/orientation and lens characteristics of each image capture device.

Upon completion of the calibration steps, the positions and orientations of the various head mounted display devices and/or camera assemblies may be known. IMU data from IMU 132 of the head mounted display device, and from position sensor 54 of the camera assembly 50, may be used to refine and/or confirm the positions and orientations of the one or more head mounted display devices 2 and camera assemblies 50.

The calibration steps performed by the calibration engine 482 and described above with respect to FIGS. 9 through 11 may be performed once, upon initial use of the one or more head mounted display devices 2 and camera assemblies 50. The users and objects within the scene may change, and thus the point clouds generated by the respective capture devices may change, but the calibration of the cameras with respect to each other may stay the same. Where a camera assembly is moved, the calibration steps may be repeated. In embodiments, the calibration engine may continue to gather data regarding cues from the point clouds of various capture devices, and in the event the calibration engine identifies better cues from two or more capture devices, it may repeat the above steps in an attempt to improve the calibration of the capture devices.

A scene map may be developed in step 610 identifying the geometry of the scene as well as the geometry, the positions of devices 2 and camera assemblies 50, and positions of objects within the scene. In embodiments, the scene map generated in a given frame may include the x, y and z positions of a user's hand(s), other real world objects and virtual objects in the scene. Methods for gathering depth and position data have been explained above.

Figure 12:
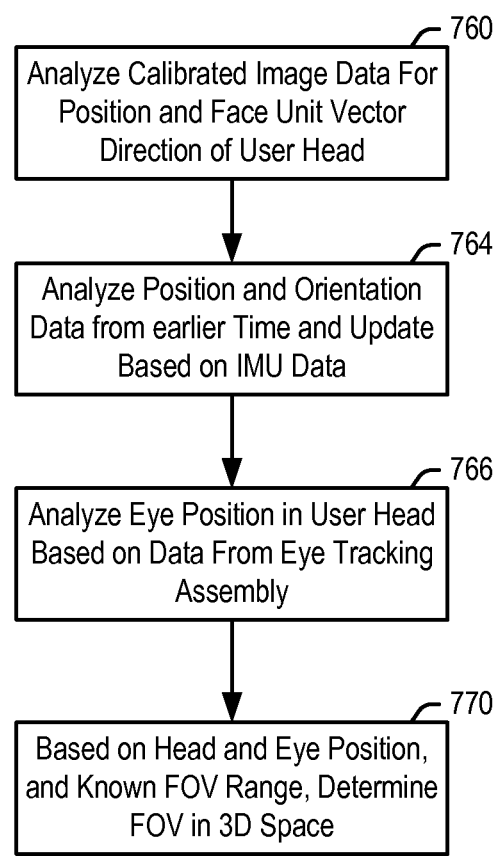

In step 612, the system may detect and track a user's skeleton and/or hands as described above, and update the scene map based on the positions of moving body parts and other moving objects. In step 614, the processing unit 4 determines the x, y and z position, the orientation and the FOV of the head mounted display device 2 within the scene. Further details of step 614 are now described with respect to the flowchart of FIG. 12.

In step 760, the image data for the scene is analyzed by the processing unit 4 to determine both the user head position and a face unit vector looking straight out from a user's face. The head position may be identified from feedback from the head mounted display device 2, and from this, the face unit vector may be constructed. The face unit vector may be used to define the user's head orientation and, in examples, may be considered the center of the FOV for the user. The face unit vector may also or alternatively be identified from the camera image data returned from the room-facing cameras 112 on head mounted display device 2. In particular, based on what the cameras 112 on head mounted display device 2 see, the processing unit 4 is able to determine the face unit vector representing a user's head orientation.

In step 764, the position and orientation of a user's head may also or alternatively be determined from analysis of the position and orientation of the user's head from an earlier time (either earlier in the frame or from a prior frame), and then using the inertial information from the IMU 132 to update the position and orientation of a user's head. Information from the IMU 132 may provide accurate kinematic data for a user's head, but the IMU typically does not provide absolute position information regarding a user's head. This absolute position information, or ground truth, may be provided from the image data obtained from the cameras on the head mounted display device 2.

In embodiments, the position and orientation of a user's head may be determined by steps 760 and 764 acting in tandem. In further embodiments, one or the other of steps 769 and 764 may be used to determine head position and orientation of a user's head.

It may happen that a user is not looking straight ahead. Therefore, in addition to identifying user head position and orientation, the processing unit may further consider the position of the user's eyes in his head. This information may be provided by the eye tracking assembly described above. The eye tracking assembly is able to identify a position of the user's eyes, which can be represented as an eye unit vector showing the left, right, up and/or down deviation from a position where the user's eyes are centered and looking straight ahead (i.e., the face unit vector). A face unit vector may be adjusted to the eye unit vector to define where the user is looking.

In step 770, the FOV of the user may next be determined. The range of view of a user of a head mounted display device 2 may be predefined based on the up, down, left and right peripheral vision of a hypothetical user. In order to ensure that the FOV calculated for a given user includes objects that a particular user may be able to see at the extents of the FOV, this hypothetical user may be taken as one having a maximum possible peripheral vision. Some predetermined extra FOV may be added to this to ensure that enough data is captured for a given user in embodiments.

The FOV for the user at a given instant may then be calculated by taking the range of view and centering it around the face unit vector, adjusted by any deviation of the eye unit vector. In addition to defining what a user is looking at in a given instant, this determination of a user's FOV is also useful for determining what may not be visible to the user. As explained below, limiting processing of virtual objects to those areas that are within a particular user's FOV may improve processing speed and reduces latency.

Referring again to FIG. 9, in step 620, the frustum view of the one or more camera assemblies 50 may be determined. This determination may be made in the same or analogous way as described above with respect to steps 764 and 770.

In accordance with aspects of the present technology, a view of the virtual and real objects of a mixed reality scene, from the perspective of any of the head mounted display devices 2 or camera assemblies 50, may be displayed on the one or more monitors 60. In step 624, the processing unit 4 and/or computing system 70 may receive selection from a user or operator of a head mounted display device 2 or camera assembly 50. Thereafter, steps 630-658 for rendering and displaying virtual objects use the view perspective of the selected head mounted display device 2 or camera assembly 50. The following steps 630-658 relate to displaying an image on the one or more monitors 60. However, a similar set of steps 630-658 may also be performed in parallel for displaying an image to the head mounted display devices 2, from the perspective of the head mounted display device 2.

In step 630, the processing unit 4 may cull the rendering operations so that just those virtual objects which could possibly appear within the final frustum view of the selected camera assembly or head mounted display device are rendered. The positions of other virtual objects may still be tracked, but they are not rendered. It is also conceivable that, in further embodiments, step 630 may be skipped altogether and the entire image is rendered.

The processing unit 4 and/or computing system 70 may next perform a rendering setup step 638 where setup rendering operations are performed using the scene map and FOV received in steps 610, 614 and 620. Once virtual object data is received, the processing unit may perform rendering setup operations in step 638 for the virtual objects which are to be rendered on the monitor 60. The setup rendering operations in step 638 may include common rendering tasks associated with the virtual object(s) to be displayed. These rendering tasks may include for example, shadow map generation, lighting, and animation. In embodiments, the rendering setup step 638 may further include a compilation of likely draw information such as vertex buffers, textures and states for virtual objects to be displayed in the predicted final FOV.

Using the information regarding the locations of objects in the 3-D scene map, the processing unit 4/computing system 70 may next determine occlusions and shading from the view of the selected device 2/assembly 50 in step 644. In particular, the scene map has x, y and z positions of objects in the scene, including any moving and non-moving virtual or real objects. Knowing the location of the selected view and its line of sight to objects in the FOV, the processing unit 4 and/or computing system 70 may then determine whether a virtual object partially or fully occludes the view of a real world object. Additionally, the processing unit 4 and/or computing system 70 may determine whether a real world object partially or fully occludes the view of a virtual object.

In step 646, the GPU 322 of processing unit 4 (or a GPU in the computing system 70) may next render an image to be displayed on the monitor 60. Portions of the rendering operations may have already been performed in the rendering setup step 638 and periodically updated. Any occluded virtual objects may not be rendered, or they may be rendered. Where rendered, occluded objects will be omitted from display by the opacity filter 114 as explained above.

In step 650, the processing unit 4 and/or computing system 70 checks whether it is time to send a rendered image to the monitor 60, or whether there is still time for further refinement of the image using more recent position feedback data from the head mounted display device 2 and/or camera assemblies 50. In a system using a 60 Hertz frame refresh rate, a single frame is about 16 ms.

If time to display an updated image, the image from the selected camera assembly 50 or head mounted device 2 is sent to the monitor 60. For example, where a camera assembly 50 is selected, the real world image captured by the camera 52 is sent to the monitor 60 for display. Where a head mounted display is selected, the real world image captured by the RGB camera of the room-facing camera 112 is sent to the monitor for display. Additionally, any virtual objects in the determined frustum view are also sent to the monitor 60 to be displayed at the appropriate pixels, accounting for perspective and occlusions. At this time, the control data for the opacity filter is also transmitted from processing unit 4 and/or computing system 70 to the monitor 60 to apply the opacity filter settings. The monitor 60 may then display the fused image of real and virtual objects in step 658.

In embodiments described above, depth and other image data from a camera assembly 50 is used to determine occlusions in the view of the camera assembly. Data from the scene map established by the processing unit 4 and head mounted display device 2 may also be used in determining a surface mesh of objects in the scene map. This data and surface mesh may also be used when determining occlusions in the view of the camera assembly.

It may be that a user 18 is blocking the view of a virtual object from the perspective of the selected camera assembly 50. In embodiments, the depth and other image data from the camera assembly 50 and/or the scene map from the processing unit 4 and head mounted display device 2 may be used to determine occlusions of virtual objects due to the user 18 blocking part or all of a virtual object from the perspective of the selected camera assembly 50.

In further embodiments, instead of using depth or image data from the camera assembly 50 or the scene map, the known location of a user 18 may be used to determine occlusions from the selected camera assembly 50 perspective. For example, the position of the head mounted display device 2 worn by the user 18 is known. The position of the user 18 may alternatively or additionally be detected by a skeletal tracking algorithm. Thereafter, a geometric shape approximating the size and shape of the user 18 may be constructed and used for the purpose of determining occlusions of virtual content by the user from the perspective of the selected camera assembly 50.

On the other hand, where it is not yet time to send a frame of image data to be displayed in step 650, the processing unit and/or computing system 70 may loop back for more recent sensor data to refine the predictions of the final view and the final positions of objects in the view. In particular, if there is still time in step 650, the processing unit 4 and/or computing system 70 may return to step 604 to get more recent sensor data from the head mounted display device 2 and camera assemblies 50.

The processing steps 600 through 658 are described above by way of example only. It is understood that one or more of these steps may be omitted in further embodiments, the steps may be performed in differing order, or additional steps may be added.

Using the system described above, a mixed reality experience including virtual and real objects may be displayed on a monitor for viewing by people not wearing a head mounted display device. Moreover, by positioning the camera assemblies 50 at desired positions around a mixed reality scene, different views of the mixed reality environment may be selected and displayed on the monitor.

Figure 13:
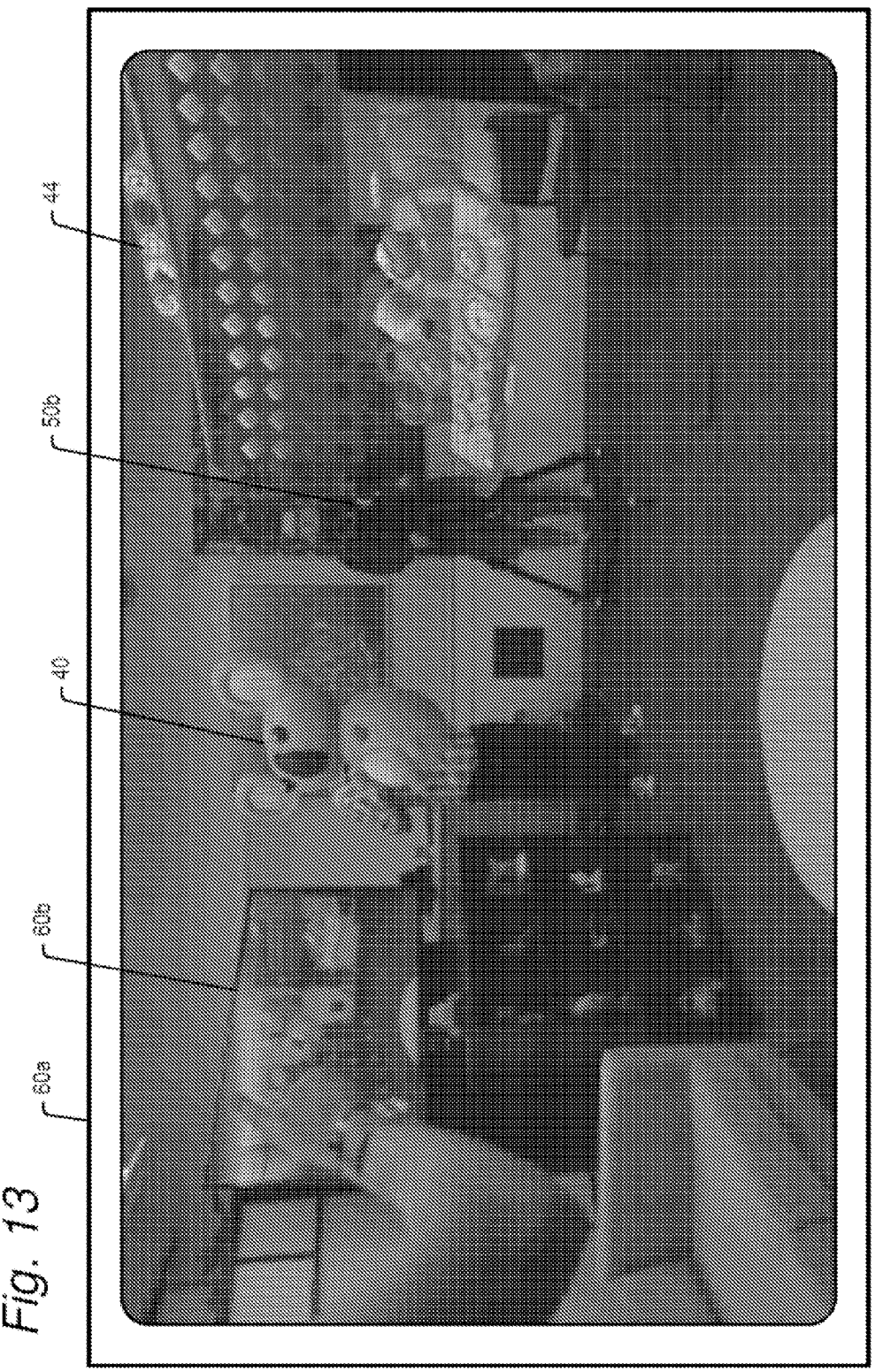
FIG. 13 is a display on a monitor of a mixed reality environment captured by a camera assembly of the present technology.

FIG. 13 illustrates a screen shot captured by a first camera assembly 50a (not shown) and displayed on a first monitor 60a. The screen shot shows real objects and virtual objects (including virtual content 40 and virtual tools 44). A second camera assembly 50b is also within the scene and is captured in the screen shot. The first monitor 60a is also displaying a second monitor 60b that is also in the scene. The second monitor 60b is showing the same image as is shown in the FIG. 13 (i.e., the same image that is being shown on the first monitor 60a).

Figure 14:
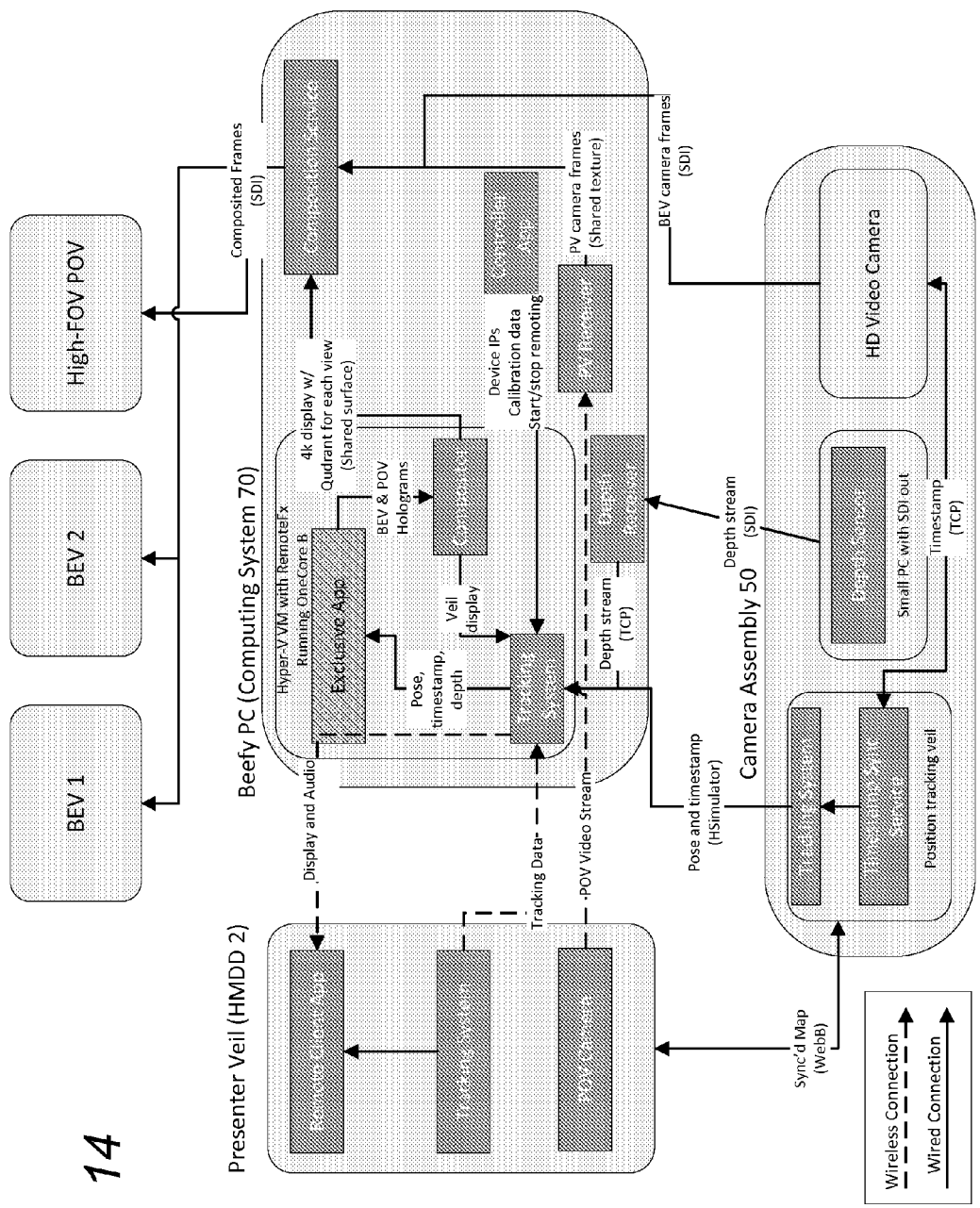
FIG. 14 is a block diagram of a system according to embodiments of the present technology.

FIG. 14 illustrates a block diagram of an embodiment of the system according to the present technology. While communications between components are shown with specific wired or wireless connections, it is understood that communications between components may be wired or wireless in further embodiments.

Some other features of the present technology include that a video feed of a mixed reality environment may be sent over a network connection to a remote location. The mixed reality environment may then be viewed, either on a monitor or via a head mounted display device at the remote location.

In further embodiments, the present technology employs a time synchronization system and method of gathering poses at the moment that the sensor exposes itself to get solid world locked virtual objects. The virtual objects are rendered at a later time than the time when the real world image is obtained from the cameras 52. That's because poses from the tracking device on the camera assembly are received 60 Hz. In embodiments, the system may take camera poses at distinct, successive periods of time. The system is then able to interpolate between these periods of time to precisely know the camera pose at a given instant in time with sub millisecond accuracy. With the position of a camera assembly known at a precise instant in time, the virtual objects to be rendered for that precise instant in time, to provide an extremely close matching of virtual objects to the real world video feed. Such a method employs a slight delay, e.g., 100 to 150 ms delay, in rendering objects but provides for seamless fusion of virtual and real objects in an image generated by a camera assembly 50.

In further embodiments, for any given moment in time, the zoom/focus/exposure/white balance/ISO settings of the camera 52 of the camera assembly 50 may be electronically communicated to the processing unit 4 and/or computing system 70 so the proper zoom, blur and other settings can be used for that exact frame. This allows rendering of a virtual image that geometrically and qualitatively matches the image produced by the lens on the sensor of the high end camera.

Embodiments described above have included camera assemblies 50 and the user wearing a head mounted display device 2. In further embodiments, the head mounted display device 2 may be omitted. In such an embodiment, the user 18 may have a device including sensors allowing it to track its position in space. Such device may for example be a cellular telephone or computing tablet. The scene map could be built by sensors in the one or more camera assemblies 50, and/or the device held by the user 18. The mixed reality environment to be displayed to the user via a monitor 60 or the device held by the user.

In summary, in one embodiment, the present technology relates to a system for presenting a mixed reality environment including real and virtual objects, the system comprising: a head mounted display device including a display unit for displaying a three-dimensional virtual object in the virtual environment; one or more camera assemblies; and a processing unit operatively coupled to the display device and one or more camera assemblies, the processing unit generating a scene map comprising a three-dimensional coordinate space in which the head mounted display, the three-dimensional virtual object and the one or more camera assemblies are registered, the processing unit and a camera assembly of the one or more camera assemblies generating an image for display of the mixed reality environment, using the scene map, from a perspective of the camera assembly.

In a further embodiment, the present technology relates to a system for presenting a mixed reality environment including real and virtual objects, the system comprising: a plurality of image capture devices for capturing images of real world objects in the mixed reality environment from different perspectives; and a processing unit operatively coupled to the plurality of image capture devices, the processing unit identifying positions of the plurality of image capture devices with respect to each other, the processing unit further generating a virtual object in the mixed reality environment and identifying a position of the virtual object with respect to the plurality of image capture devices, the processing unit and an image capture device of the plurality of image capture devices generating an image of the mixed reality environment for display on a two-dimensional monitor from a perspective of the image capture device.

In another embodiment, the present technology relates to a method of presenting a mixed reality environment including real and virtual objects, the method comprising: (a) capturing a first image of the mixed reality environment from a first perspective via a first camera incorporated into a head mounted display device; (b) capturing a second image of the mixed reality environment from a second perspective via a second camera incorporated into a camera assembly; (c) generating a virtual object at a position in the mixed reality environment; (d) displaying the virtual object onto optics on the head mounted display device, the virtual object being displayed from a perspective of the head mounted display device; and (e) displaying the second image from the camera assembly together with the virtual object onto a two-dimensional display device, the virtual object being displayed from a perspective of the camera assembly.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A system for presenting a mixed reality environment including real and virtual objects, the system comprising:
   a head mounted display device including a display unit for displaying a three-dimensional virtual object in the virtual environment and a first set of one or more cameras;
   one or more camera assemblies, remote from the head mounted display device, for capturing video of real objects in the mixed reality environment; and
   a processing unit operatively coupled to the display device and the one or more camera assemblies, the processing unit generating a scene map comprising a three-dimensional coordinate space in which the head mounted display, the three-dimensional virtual object and the one or more camera assemblies are registered, the processing unit and a camera assembly of the one or more camera assemblies generating an image of the mixed reality environment including video of real objects and the virtual object for display from a perspective of the camera assembly.

2. The system of claim 1, the camera assembly including an image capture device for capturing a color or black and white image of real objects in the mixed reality environment.

3. The system of claim 1, the camera assembly including an image sensor for capturing depth data of the mixed reality environment, the depth data used to generate a depth map of the mixed reality environment from a perspective of the image sensor.

4. The system of claim 1, the camera assembly and the head mounted display device calibrated to a common coordinate system by the camera assembly and the head mounted display device capturing one or more images of a calibration cue.

5. The system of claim 4, wherein, the processing unit determining poses of the camera assembly and head mounted display device based on depth imaging sensor data from the one or more images of the calibration target from perspectives of the camera assembly and the head mounted display device.

6. The system of claim 1, the camera assembly calibrated in the three-dimensional coordinate space of the scene map using at least one of a depth map and an RGB image generated at least in part by the camera assembly.

7. The system of claim 1, the camera assembly including a position sensor including an inertial measurement unit for assisting in registering the camera assembly within the three-dimensional coordinate space of the scene map.

8. The system of claim 1, the camera assembly being a first camera assembly, the one or more camera assemblies further comprising a second camera assembly, and the system further comprising a selection device for selecting a display of the mixed reality environment from a perspective of either of the first and second camera assemblies.

9. The system of claim 8, further comprising at least first and second two-dimensional monitors, the first monitor displaying the image of the mixed reality environment from the perspective of the first camera assembly and the second monitor displaying the image of the mixed reality environment from the perspective of the second camera assembly.

10. A system for presenting a mixed reality environment including real and virtual objects, the system comprising:
    a plurality of image capture devices for capturing images of real world objects in the mixed reality environment from different perspectives; and
    a processing unit operatively coupled to the plurality of image capture devices, the processing unit identifying poses of the plurality of image capture devices with respect to each other, the processing unit further generating a virtual object in the mixed reality environment and identifying a position of the virtual object with respect to the plurality of image capture devices, the processing unit and an image capture device of the plurality of image capture devices generating an image of the mixed reality environment for display on a two-dimensional monitor from a perspective of the image capture device.

11. The system of claim 10, wherein the image capture device comprises a camera on a head mounted display device, the head mounted display device further comprising a display unit for displaying the virtual object to optics in the head mounted display device.

12. The system of claim 10, wherein the image capture device comprises a camera assembly.

13. The system of claim 12, the camera assembly comprising a color image capture device for capturing a color image of real objects in the mixed reality environment, and an image sensor for capturing depth data of the mixed reality environment, from which depth data a depth map of the mixed reality environment may be generated from a perspective of the image sensor.

14. The system of claim 13, the processing unit identifying the pose of the camera assembly relative to other image capture devices using at least one of the RGB image and the depth map.

15. The system of claim 12, the camera assembly including a position sensor including an inertial measurement unit for assisting in identifying the pose of the camera assembly relative to other image capture devices.

16. A method of presenting a mixed reality environment including real and virtual objects, the method comprising:
 (a) capturing a first image of the mixed reality environment from a first perspective via a first camera incorporated into a head mounted display device;
 (b) capturing a second image of the mixed reality environment from a second perspective via a second camera incorporated into a camera assembly;
 (c) generating a virtual object at a position in the mixed reality environment;
 (d) displaying the virtual object onto optics on the head mounted display device, the virtual object being displayed from a perspective of the head mounted display device; and
 (e) displaying the second image from the camera assembly together with the virtual object onto a two-dimensional display device, the virtual object being displayed from a perspective of the camera assembly.

17. The method of claim 16, further comprising the step of changing a display on the two-dimensional display device to displaying the first image from the head mounted display device together with the virtual object, the virtual object being displayed from a perspective of the head mounted display device.

18. The method of claim 16, further comprising the step of registering poses of the head mounted display device, the camera assembly and the virtual object to each other using at least objects in common in the first and second images.

19. The method of claim 16, further comprising the step of capturing the second image by camera assembly from one of the sides, below and above the position of the virtual object.

20. The method of claim 16, further comprising the step of a wearer of the head mounted display device constructing the virtual object using virtual object tools, the second image from the camera assembly displayed on the two-dimensional monitor comprising a video feed showing the virtual tools and the virtual object as it is being constructed.

* * * * *